United States Patent [19]
Naffziger

[11] Patent Number: 5,719,803
[45] Date of Patent: Feb. 17, 1998

[54] HIGH SPEED ADDITION USING LING'S EQUATIONS AND DYNAMIC CMOS LOGIC

[75] Inventor: Samuel D. Naffziger, Fort Collins, Colo.

[73] Assignee: Hewlett-Packard Company, Palo Alto, Calif.

[21] Appl. No.: 658,925

[22] Filed: May 31, 1996

[51] Int. Cl.⁶ .................................................. G06F 7/50
[52] U.S. Cl. ........................... 364/787.01; 364/784.05
[58] Field of Search ............................. 364/787, 787.01, 364/784.05

[56] References Cited

U.S. PATENT DOCUMENTS

| | | | |
|---|---|---|---|
| 4,569,032 | 2/1986 | Lee | 364/787 |
| 4,858,168 | 8/1989 | Hwang | 364/787 |
| 4,899,305 | 2/1990 | Needles | 364/787 |
| 5,140,546 | 8/1992 | Ishikawa et al. | 364/787 |
| 5,208,490 | 5/1993 | Yetter . | |
| 5,285,406 | 2/1994 | Lynch et al. | 364/787 |
| 5,329,477 | 7/1994 | Kudou | 364/787 |
| 5,392,423 | 2/1995 | Yetter . | |
| 5,581,497 | 12/1996 | Kumar | 364/787 |

OTHER PUBLICATIONS

N. Quach & M. Flynn, "High Speed Addition in CMOS", Stanford Technical Rep.: CSL–TR–90–415, Feb. 1990.

M. Flynn, "Topics in Arithmetic For Digital Systems Designers" (Preliminary Second Edition §1992), pp. 89–94, 102–105.

H. Ling, "High Spped Binary Adder", IBM J. of Res. & Dev., vol. 25, No. 3, pp. 156–166, May 1981.

H. Ling, "High Speed Binary Parallel Adder", IEEE Trans. Comput., pp. 799–802, Oct. 1966.

Dobberpuhl et al., "A 200–Mhz 64b Dual–Issue CMOS Microprocessor", IEEE J. of Solid State Circuits, vol. 27, No. 11, pp. 1555–1567, Nov. 1992.

A. Inoue, Y. Kawabe, Y.Asada & S. Ando, "A 0.4} m 1.4ns 32b Dynamic Adder using Non–precharge Multiplexers and Reduced Precharge Voltage Technique", Symp. VLSI Circuits Digest of Tech. Papers, pp. 9–10, Jun. 1995.

M. Suzuki et al., "A 1.5–ns 32–b CMOS ALU in Double Pass–Transistor Logic" IEEE J. of Solid State Circuits, vol. 28, No. 11, pp. 1145–1151, Nov. 1993.

*Primary Examiner*—Tan V. Mai

[57] ABSTRACT

The methods and apparatus disclosed allow for a direct implementation of Ling's equations in a dynamic CMOS logic environment. In summary, low order Ling pseudo-carries and group propagate terms are generated in parallel in a single gate delay. After generating low order terms, local and non-local carry propagation proceed in parallel. Local carry propagation occurs within each quadrant of an adder and comprises 1) a dual carry ripple between most significant bits of a quadrant's low order groups, and 2) dual carry ripples between less significant bits of a quadrant's low order groups. Missing terms in low order Ling pseudo-carries and propagate terms are reabsorbed during the dual carry ripples. Non-local carry propagation first involves combining low order group terms to form 1) Ling pseudo-carries out of quadrants, and 2) quadrant-wide propagate terms. This occurs during a single gate delay. Quadrant terms are then used to generate long carries which may be used in selecting the appropriate carries, and hence, the appropriate sum, for each quadrant. Long carry generation also occurs in a single gate delay. Finally, a sum is generated and selected during a fourth and final gate delay. Circuit modularity provides for logical reductions in transistor count, and a dense layout. The disclosed adder's implementation of Ling's equations in a dynamic CMOS environment (with early reabsorption of missing propagate terms) enables construction of a 64 bit adder having a mere four gate delays between operand input and sum output.

23 Claims, 21 Drawing Sheets

HIGH SPEED ADDITION USING LING'S EQUATIONS AND DYNAMIC CMOS LOGIC

BACKGROUND OF THE INVENTION

This invention pertains to high speed digital adders, and more specifically, to high speed adders using Ling's equations and dynamic CMOS logic.

High speed addition has always been an important aspect of CPU (i.e., central processing unit or microprocessor) design. Add latency directly impacts the critical path timing of devices such as arithmetic logic units (ALUs), memory address generators, and floating point multiply accumulators (FMACs).

For example, the time from operand input to result bypass in an ALU will often be the cycle time limiter of a CPU. The ALU's adder is the primary source of this limitation.

The time from address selection to cache data return in a memory address generator will often be the frequency limiter of the integrated circuit (IC) comprising the address generator. The significant limiter of a memory address generator is an address adder.

Adders occupy numerous critical paths in an FMAC. Adders are required to 1) generate the 3X multiple used in a Booth recoded multiply array, 2) sum carry-save multiplier results, and 3) perform a final IEEE round of an FMAC result.

As a result of adders occupying these critical timing paths, there is a continuing emphasis on developing faster adders.

Conceptually, binary addition in a digital adder is simple. The bits comprising the sum, SUM, of two operands, A and B, is defined as:

$$SUM[I]=A[I] \oplus B[I] \oplus C[I],$$

where $C[I]$ is a carry into the Ith bit position of the sum. (NOTE: Throughout this document, the EXCLUSIVE OR function will be represented by "$\oplus$", the AND function will be represented by ".", the OR function will be represented by "+", and the inverse of a quantity will be represented by "~". Further, a binary quantity's least significant bit will always be its 0 bit.) $C[0]$ is by definition the carry into an adder (if any). Higher order carries are defined by the equation:

$$C[I+1]=A[I] \cdot B[I]+C[I] \cdot (A[I]+B[I]),$$

or $$C[I+1]=A[I] \cdot B[I]+C[I] \cdot (A[I] \oplus B[I]).$$

If bit generate terms, $G[I]$, and bit propagate terms, $P[I]$, are defined as:

$$G[I]=A[I] \cdot B[I],$$

and $$P[I]=A[I]+B[I],$$

or $$P[I]=A[I] \oplus B[I]$$

then the above carry equation may be alternately stated as:

$$C[I+1]=G[I]+C[I] \cdot P[I].$$

One conventional method of generating a sum is by rippling a carry. In a carry ripple adder, carries are calculated sequentially. $C[1]$ is calculated from $C[0]$, $C[2]$ is calculated from $C[1]$, and so on. An N bit carry ripple adder therefore requires N+1 gate delays to generate a sum (i.e., N delays to propagate a carry from bit 0 to bit N−1, and 1 gate delay to generate SUM[N−1]). Thus, a 64 bit adder would require 65 gate delays to generate a sum. In a high speed environment, a delay on this order is unacceptable.

The delay in generating a sum may be significantly reduced using carry look ahead (CLA) techniques. In a CLA adder, group carries are calculated in parallel to reduce carry calculation time to:

$$4*\log_R[N]$$

where R is the group carry size and N is the total number of bits to be added. The basic equation for a group of four CLA adder is:

$$\begin{aligned}C[4] =\ & G[3] + P[3] \cdot G[2] + P[3] \cdot P[2] \cdot G[1] + \\ & P[3] \cdot P[2] \cdot P[1] \cdot G[0] + \\ & P[3] \cdot P[2] \cdot P[1] \cdot P[0] \cdot C[0].\end{aligned}$$

Defining a group of four generate term as:

$$G'[0]=G[3]+P[3] \cdot G[2]+P[3] \cdot P[2] \cdot G[1]+P[3] \cdot P[2] \cdot P[1] \cdot G[0],$$

and a group of four propagate term as:

$$P'[0]=P[3] \cdot P[2] \cdot P[1] \cdot P[0],$$

the C[4] equation may be alternately written as:

$$C[4]=G'[0]+P'[0] \cdot C[0].$$

Lower order group carries may be combined to produce higher order group carries, and so on. A 64 bit CLA adder calculating group of four carries in parallel may therefore generate a sum in 12 gate delays (i.e., 1 gate delay to calculate bit generate and bit propagate terms, 2 gate delays to calculate a group of four carry, 2 gate delays to calculate a group of 16 carry (four groups of four), 2 gate delays to generate C[48], 2 gate delays to generate C[60], 2 gate delays to generate C[63], and 1 gate delay to generate SUM[63]).

While 12 gate delays is still a substantial delay in performing high speed addition, sum-select techniques may be used in conjunction with CLA techniques to further increase the speed of an adder. Conventional high speed adders are often implemented in this manner. Sum-select techniques require a calculation of two sums for each group carry block. Sums are therefore based on a dual carry system (i.e., a sum based on a "0" carry into the least significant bit of a group carry block, and a sum based on a "1" carry into a group carry block's least significant bit). In addition to using group carries to calculate higher order carries, group carries (typically the higher order group carries) can also be used to select appropriate sums for more significant group carry blocks. A combination of CLA and sum-select techniques can therefore reduce the number of gate delays in producing a 64 bit sum (again assuming four bit group carries) to $2*\log_R[N]+2$, or eight gate delays (i.e., 1 gate delay to calculate bit generate and bit propagate terms, 2 gate delays to calculate a group of four carry, 2 gate delays to calculate a group of 16 carry, 2 gate delays to generate C[48], and 1 gate delay to select SUM[63]). CLA/sum-select techniques are discussed in detail in M. Flynn, "Topics in Arithmetic For Digital Systems Designers" (Preliminary Second Edition §1992), pp.89–94, which is hereby incorporated by reference for all that it discloses.

H. Ling devised equations to capitalize upon the DOT OR, or "wired OR", capability of Emitter-Coupled (ECL) or bipolar logic. See H. Ling, "High Speed Binary Adder", IBM J. of Res. & Dev., Vol. 25, No. 3, pp.156–166, May 1981, and Flynn, Id. At 102–105, which are hereby incorporated by reference for all that they disclose. Ling's equations define a group of N "pseudo-carry" which has a shifted carry propagation chain. The equation for a group of four Ling pseudo-carry is therefore defined as:

LG[0]=G[3]+P[2]·G[2]+P[2]·P[1]·G[1]+P[2]·P[1]·P[0]·G[0]

Note that carry propagation in the above equation has been shifted by one bit with respect to carry propagation in the group generate equation G'[0], supra. Ling further defines a shifted group propagate term as:

GP[0]=P[2]·P[1]·P[0]·P[−1], where P[−1] is the most significant bit propagate term of a less significant group of four, or alternatively, a null term if GP[0] is defined with respect to an adder's least significant bit positions. A true carry is therefore defined by Ling as:

C[4]=P[3]·(LG[0]+GP[0]·C[0]), and the conventional group generate and propagate terms may be defined as:

G'[0]=P[3]·LG[0], and

P'[0]=P[3]·GP[0].

Ling's equations are advantageous in that G[I] implies G[I]·P[I], and the LG[0] equation may therefore be simplified to:

LG[0]=G[3]+G[2]+P[2]·G[1]+P[2]·P[1]·G[0].

This simplification is beneficial since an expansion of LG[0] in terms of input operands A and B yields an equation of eight terms with a fanin of four. This is in lieu of the fifteen terms with a fanin of five which result from a similar expansion of C[4] (i.e., LG[0]=A[3]·B[3]+A[2]·B[2]+A[2]·A[1]·B[1]+B[2]·A[1]·B[1]+A[2]·A[1]·A[0]·B[0]+A[2]·B[1]·A[0]·B[0]+B[2]·A[1]·A[0]·B[0]+B[2]·B[1]·A[0]·B[0]). Loading of input lines, and delays caused through series connections of transistors, are therefore mitigated. Furthermore, a group of four Ling-pseudo carry can be generated in one gate delay, whereas generation of a group of four real carry requires three gate delays (assuming a possible fanin of four). Higher order Ling pseudo-carries can therefore be calculated at an earlier stage than higher order real carries, and the number of gate delays in generating a 64 bit sum is reduced to $\log_R[N/2]+1$, or four gate delays.

While Ling's equations can be advantageously used in ECL circuits, CMOS (Complimentary Metal-Oxide Semiconductor) circuits are now the industry norm. CMOS circuits are generally faster, smaller, more power efficient, and easier to make than ECL circuits. Unfortunately though, static CMOS circuits have a fanin limitation of three. As designed, Ling's equations require a fanin of four. Attempts to modify Ling's equations for use in a CMOS environment have therefore resulted in adders having an increased transistor count, and/or little or no speed increase over conventional CLA/sum-select adders. For example, see N. Quach and M. Flynn, "High-Speed Addition in CMOS", Stanford Technical Rep.: CSL-TR-90-415, Feb. 1990.

It is therefore a primary object of this invention to provide a new method and apparatus for performing high speed addition.

It is another object of this invention to provide a method and apparatus for performing high speed addition using Ling's equations.

It is a further object of this invention to provide a method and apparatus for performing high speed addition in a dynamic CMOS logic environment.

It is yet another object of this invention to provide apparatus for performing high speed addition which is area and power efficient.

Additional objects of this invention include providing apparatus for performing high speed addition which is self-timed, functionally complete, and extremely reliable.

SUMMARY OF THE INVENTION

In the achievement of the foregoing objects, the inventor has devised carry propagation apparatus which directly implements Ling's equations in a dynamic CMOS logic environment. Dual rail logic (also known as vector logic or mousetrap logic) was chosen as the dynamic CMOS logic of choice due to its qualities of being: functionally complete, self-timed, reliable, and very fast. Dual rail logic is described in detail in U.S. Pat. No. 5,208,490 to Yetter entitled "Functionally Complete Family of Self-Timed Dynamic Logic Circuits". This patent is hereby incorporated by reference for all that it discloses.

In brief, a dual rail logic system requires two logic paths (i.e., high and low rail components) to represent a single logic variable. If both rails exhibit a low logic signal, the variable is in an invalid state. If the high rail logic path exhibits a high logic signal, the variable is true. If the low rail logic path exhibits a high logic signal, the variable is false. The case wherein both rails exhibit a high logic signal is undefined, and should be prevented from occurring.

A logic gate of a dual rail system comprises high and low rail components. Each component comprises an arming mechanism, a dynamic CMOS logic block, and a buffer mechanism. In operation, the arming mechanisms supply a precharge to their respective buffers (e.g., during a clock low). Incoming logic is operated upon by the dynamic logic blocks and is used to trigger either the high or low rail buffer (e.g., during a clock high). After generating a valid output, the logic gate becomes disabled until the arming mechanisms reset the buffers (e.g., during a subsequent clock low).

In addition to being fast, dual rail logic also provides a seamless interface with either dynamic or static logic existing downstream from an adder.

The method and apparatus disclosed herein are highly modular. For example, the preferred adder embodiment comprises 64 bit positions divided into four modular quadrants of 16 bits. See FIG. 2. Within each of the modular quadrants, further modularity exists between groups of four bits. See FIG. 3. Although the inventor has conceived of adders comprising groups and quadrants of varying bit size, the terms "local carry propagation" and "non-local carry propagation" are respectively used to refer to propagation of carries within a quadrant, and between quadrants.

While carry propagation terms missing from Ling pseudo-carries and Ling propagate terms can be reabsorbed during the final calculation of a sum, the inventor has found that absorption of missing terms at an earlier stage is advantageous. In summary, the preferred embodiment of a 64 bit dynamic CMOS adder operates as shown in FIG. 1. Four bit Ling pseudo-carries and group propagate terms are generated in parallel in a single gate delay. After generating initial four bit group terms, local and non-local carry propagation proceed in parallel.

Local carry propagation occurs within each quadrant of an adder and comprises 1) a dual carry ripple between most significant bits of groups of four, and 2) dual carry ripples between less significant bits of groups of four. Missing terms in group of four Ling pseudo-carries and propagate terms are reabsorbed during the dual carry ripple between most significant bits of groups of four. A dual carry ripple means that a first set of carries is generated on the assumption that a "0" is carried into a quadrant, and a second set of carries is generated on the assumption that a "1" is carried into a quadrant.

Non-local carry propagation first comprises combining low order group terms to form 1) Ling pseudo-carries out of quadrants, and 2) quadrant-wide propagate terms. This occurs during a single gate delay. Quadrant terms are then used to generate long carries which may be used in selecting the appropriate carries, and hence, the appropriate sum, for each quadrant. Long carry generation also occurs in a single gate delay.

Finally, a sum is generated and selected during a fourth and final gate delay.

The modular design of the disclosed adder, including the use of Manchester carry chains in 1) the generation of quadrant terms, and 2) the rippling of carries between less significant bits of a low order group, provides for logical reductions in transistor count, and a dense layout.

The disclosed adder's implementation of Ling's equations in a dynamic CMOS environment (with early reabsorption of missing propagate terms) enables construction of a 64 bit adder having a mere four gate delays between operand input and sum output.

Using the above techniques, a 64 bit full adder has been implemented in a 0.5μ CMOS process using a mere 6,924 transistors and 0.246 mm² of IC surface area in three layers of metal. The adder produces a sum in only 0.930 nanoseconds.

These and other important advantages and objectives of the present invention will be further explained in, or will become apparent from, the accompanying description, drawings and claims.

BRIEF DESCRIPTION OF THE DRAWINGS

Illustrative and presently preferred embodiments of the invention are illustrated in the drawings in which.

DESCRIPTION OF THE PREFERRED EMBODIMENT

Figure 2:
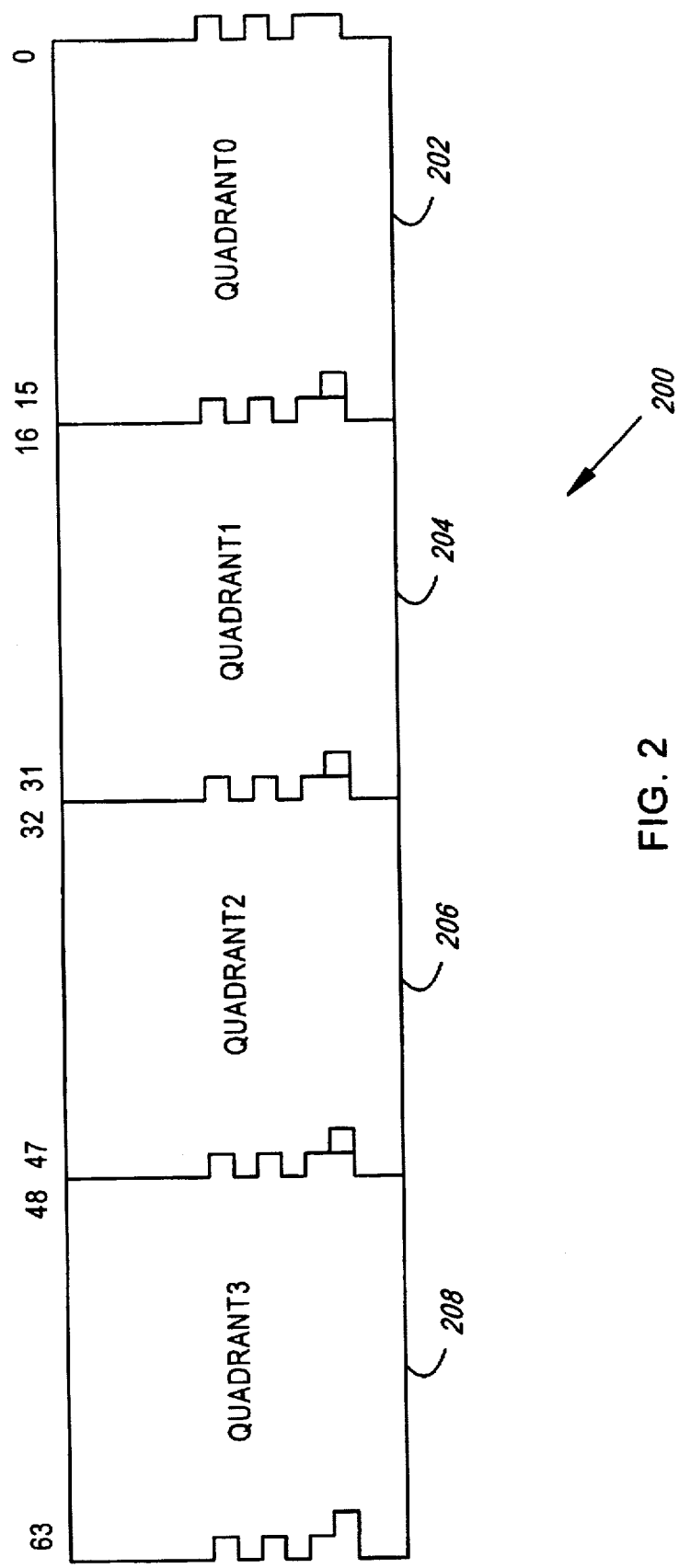
FIG. 2 is a schematic illustrating a 64 bit adder divided into four quadrants.
Figure 3:
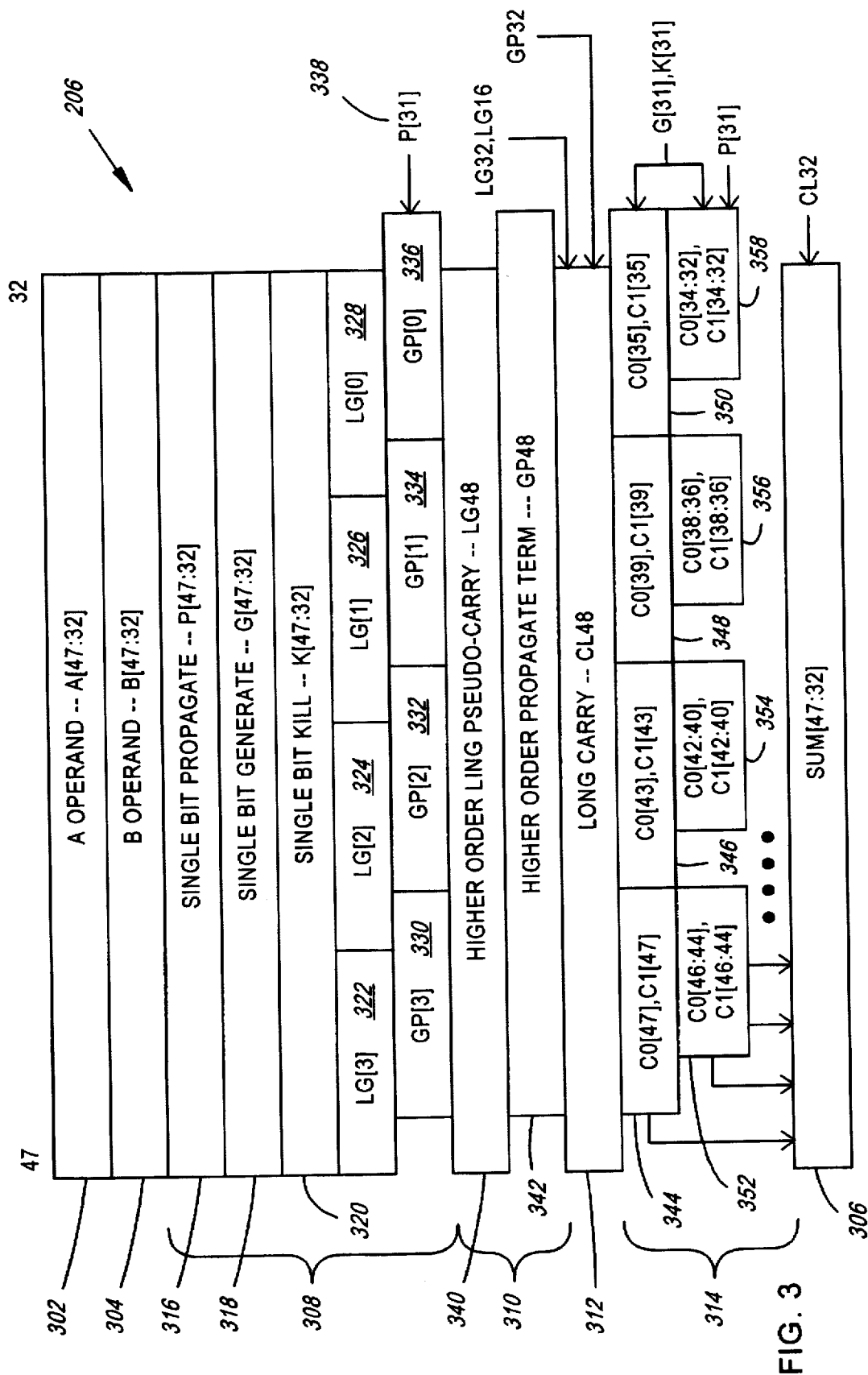
FIG. 3 is a schematic illustrating circuit modularity within QUADRANT 2 of the FIG. 2 adder.

Various apparatus for performing high speed addition, and more particularly, for propagating carries in a high speed adder, is pictured in FIGS. 2, 3, 5–7 and 9–12. As shown in FIG. 2, high speed adders 200 are generally laid out in a modular fashion such that the adder 200 comprises a plurality of similarly constructed quadrants 202–208. Each of the adder's quadrants 202–208 comprises inputs for adjacent bits of operands A and B (where A and B are the operands to be added).

Apparatus for propagating carries in an adder quadrant 206 (FIG. 3) may generally comprise a plurality of dynamic CMOS logic circuits 322–328 for generating local Ling pseudo-carries for adjacent groups of N corresponding input bits (the bits of A 302 and B 304 corresponding in that for every bit A[I] there exists a bit B[I]). The apparatus may further comprise a plurality of dynamic CMOS logic circuits 330–336 for generating group of M local propagate terms for adjacent groups of M corresponding input bits. Variables M and N will typically be equal to one another. However, each group of M input bits 336 is, by definition, of one bit less significance than a corresponding group of N input bits 328. Thus, groups of M and N bits will exist in equal numbers within an adder quadrant 206. Note, however, that while groups of N bits 322–328 are in alignment with the quadrant's input bits, no bit exists to fill the least significant bit position of a quadrant's least significant group of M bits 336. This bit position may be filled by the most significant bit 338 of an adjacent quadrant 204 (FIG. 2), or alternatively, may be satisfied by a null quantity as will be more fully explained below. Additionally, the apparatus may comprise a dynamic CMOS logic circuit 340 for generating a Ling pseudo-carry 340 out of the quadrant 206. The Ling pseudo-carry 340 out of the quadrant 206 is derived from 1) the local Ling pseudo-carries 322–328, and 2) the group of M local propagate terms 330–336.

Figure 1:
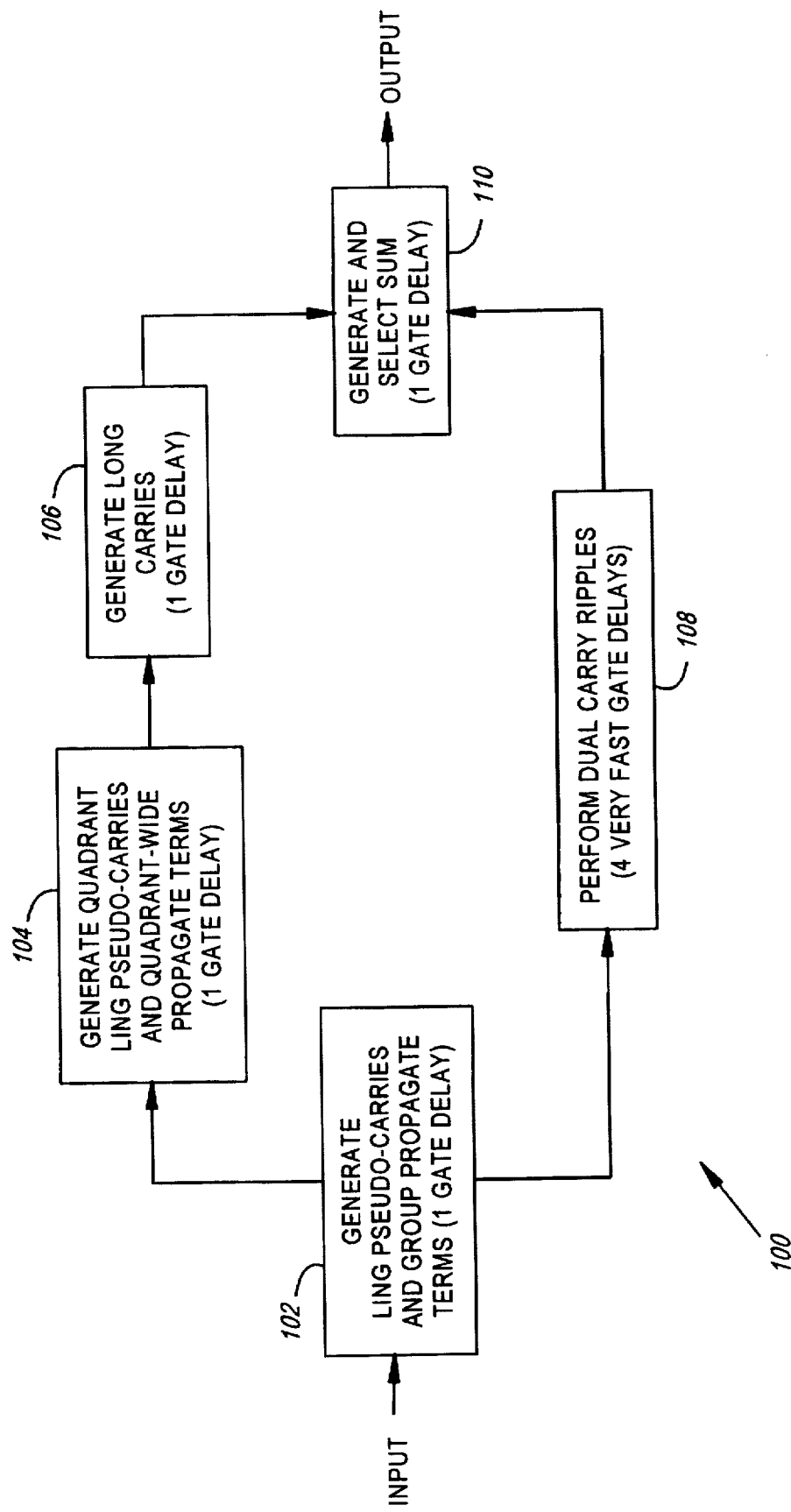
FIG. 1 is a flow diagram illustrating steps performed within a high speed adder.

Although dynamic CMOS carry propagation and addition provides significant advantages over static carry propagation and addition, careful use of N−1 bit generate terms, and construction of Ling pseudo-carry circuits 322–328 to produce same, can result in even faster, smaller adders 200. A method (FIG. 1) of producing carries in a dynamic CMOS adder quadrant 206 implementing Ling's equations may therefore include the step of generating the terms $G[I]=(A[I] \cdot B[I])$, $P[I]=(A[I] \oplus B[I])$, and $K[I]=(\sim A[I] \cdot \sim B[I])$ 316–320 (FIG. 3), where $G[I]$, $P[I]$, and $K[I]$ are the Generate, Propagate and Kill terms for the Ith bit of the adder quadrant 206. The method may also include the step of generating 102 Ling pseudo-carries corresponding to adjacent groups of N corresponding input bits. Multiple bit propagate terms (i.e., group of M propagate terms) corresponding to the Ling pseudo-carries can also be generated 102. The method may also comprise generating "group of N−1" generate terms. Group of N−1 generate terms correspond to the less significant N−1 bits of each group of N. Preferably, all of the above steps are performed in parallel. Beginning with a predetermined group of N input bits, a carry into the group's most significant bit position may be produced 108 by logically ORing 1) a G[I] term of immediate less significance than the predetermined group of N, with 2) a carry into a less significant group of N's most significant bit. This quantity may then be ANDed with the predetermined group of N's corresponding multiple bit propagate term, and the resulting quantity may then be ORed with the group of N's N−1 bit generate term. After completing these steps with the predetermined group of N, the steps may be sequentially repeated for groups of N which are more significant than the predetermined group. Finally, carries into a group of N's less significant N−1 bits may be derived 108 from the carry into a less significant group of N's most significant bit.

In conformance with the above method, apparatus for adding a quadrant 206 (FIG. 3) of adjacent bits of operands A 302 and B 304 may comprise a plurality of dynamic CMOS logic circuits 316–320 for generating $G[I]=(A[I] \cdot B[I])$, $P[I]=(A[I]+B[I])$, and $K[I]=(\sim A[I] \cdot \sim B[I])$ terms. The apparatus may further comprise a plurality of dynamic CMOS logic circuits 322–328 for generating 1) local Ling pseudo-carries for adjacent groups of N corresponding input bits, and 2) group of N−1 generate terms corresponding to the less significant N−1 bits of each group of N input bits. Additionally, the apparatus may comprise a plurality of dynamic CMOS logic circuits 330–336 for generating group of M local propagate terms for adjacent groups of M corresponding input bits. Again the variables M and N should be equal, but each group of M input bits 336 should be of one bit less significance than a corresponding group of N input bits 328. The apparatus may also comprise a plurality of dynamic CMOS logic circuits 344–350 for propagating real carries, C[I], into the most significant bits of group of N input bits. Each of the real carries is derived from a corresponding group of N−1 generate term, group of M local propagate term, and G[I] term corresponding to a group of M input bit's least significant bit. A plurality of dynamic CMOS logic circuits 352–358 may also exist for propagating real carries, C[I], into the less significant N−1 bits of each group of N. Each of these real carries is derived from a real carry, C[I], propagated into an immediate less significant group of N bits, and P, G, and K terms. Finally, the apparatus may include a plurality of dynamic CMOS logic circuits 306 for generating the bits of a sum. The sum, SUM, is equal to A plus B, and the value of each bit of the sum, SUM[I], is defined as $SUM[I]=A[I] \oplus B[I] \oplus C[I]$.

Having thus described the above method (FIG. 1) and apparatus (FIG. 3) for performing high speed addition in general, the method and apparatus will now be described in further detail with respect to their preferred embodiments.

In their preferred embodiments, the above techniques, method and apparatus are embodied in a 64 bit dual rail adder 200 (FIG. 2). The inputs to the adder 200 are two 64 bit operands designated as operands A and B. In a macro-view of the adder 200, the bits of each operand are consecutively numbered, from least significant to most significant, as bits 0 through 63. The adder 200 comprises a plurality of quadrants (QUADRANT0 202, QUADRANT1 204, QUADRANT2 206, QUADRANT3 208). Each of the quadrants 202–208 is similar in construction. QUADRANT2 206, which corresponds to bits 32–47 of the input operands 302, 304 and SUM 306, is shown in more detail in FIG. 3. In a microview of the adder 200, the bits of each operand 302, 304 and the SUM 306 are repetitively numbered in groups of N bits 322–328 (e.g., N=4), from least significant to most significant, as 0, 1, 2. 3; 0, 1, 2, 3; etc. Each run of consecutively numbered N bits in the microview will be termed a "group of N" (i.e., group of four), or a "low order Ling pseudo-carry group". Since the value of each bit is determined by high and low logic rails, each numbered bit will further comprise a high rail, H, and low rail, L, component. For example, bit 15 of operand A will comprise components A H[15] and AL[15]. Also in a microview, the bits of each operand 302, 304 are numbered in "groups of M bits" 330–336 (i.e., "groups of four" if M=N=4). The groups of M 336 are shifted with respect to the groups of N 328 so as to be of one bit less significance than the groups of N. The groups of M may sometimes be referred to as "low order propagate groups".

Figure 4:
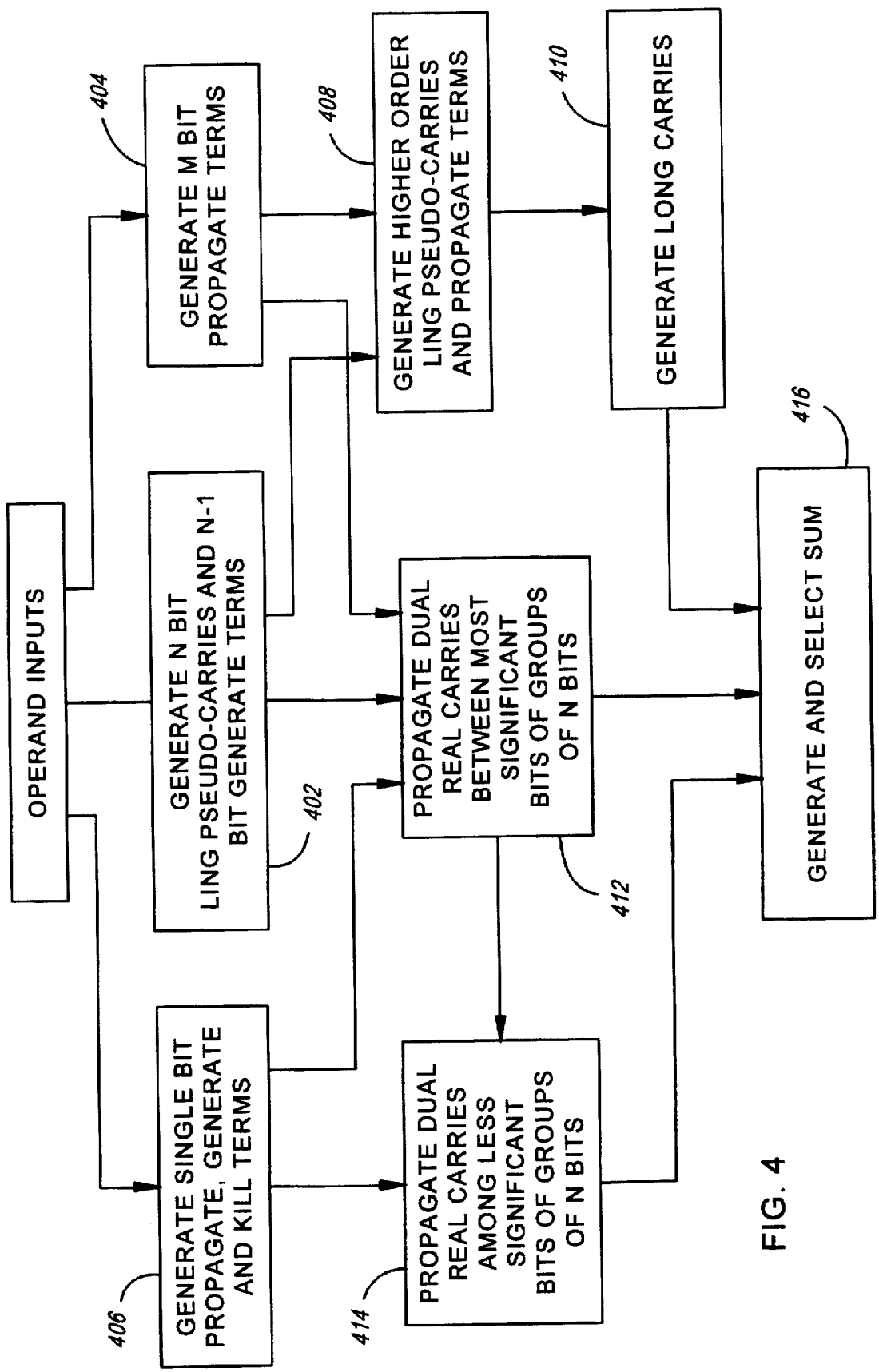
FIG. 4 is a flow diagram illustrating a method for adding two operands in a dynamic CMOS adder.
Figure 5:
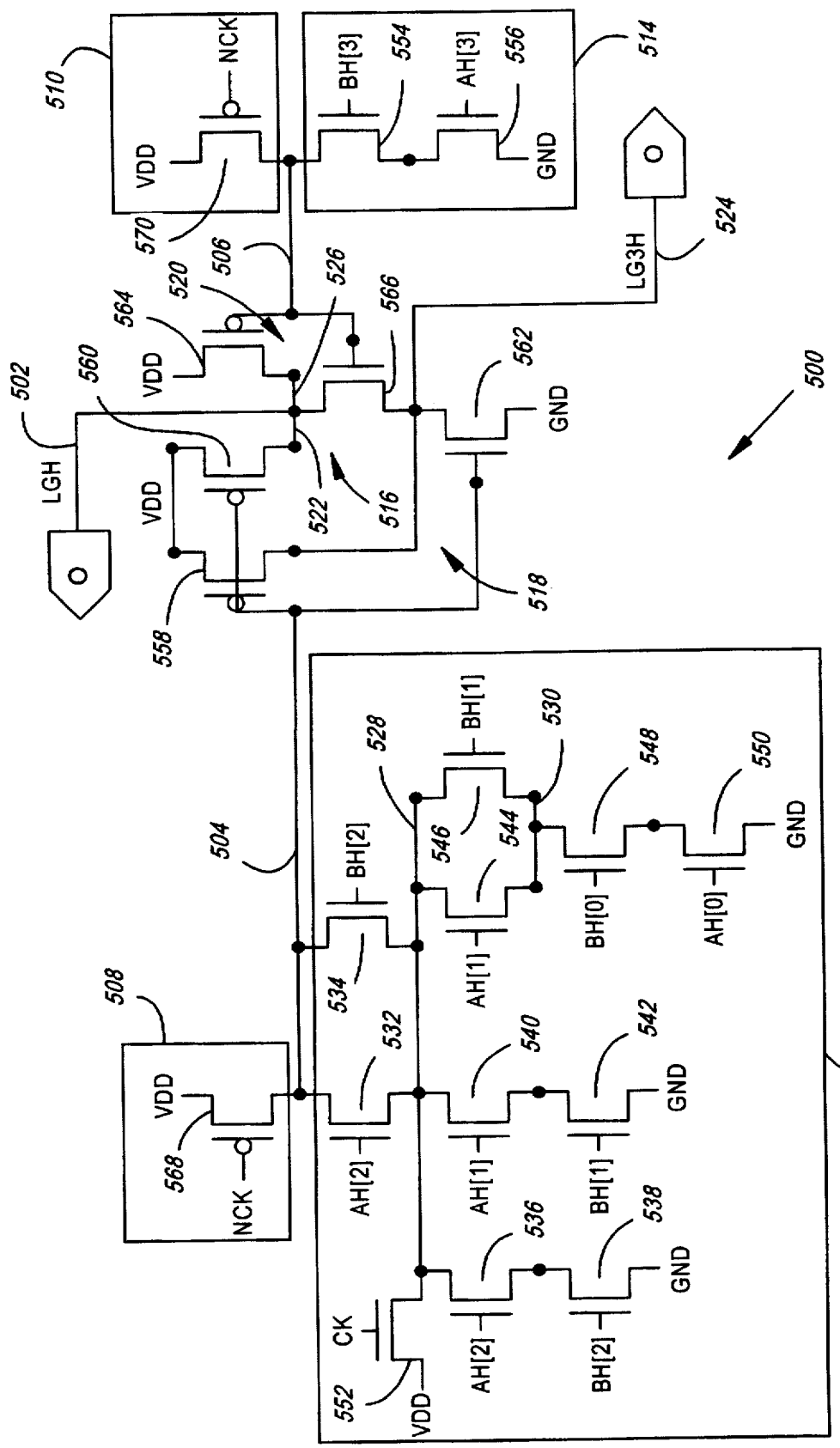
FIG. 5 is a schematic illustrating a circuit for simultaneously generating a group of four Ling pseudo-carry, LGH, and a three bit generate term, LG3H.
Figure 6:
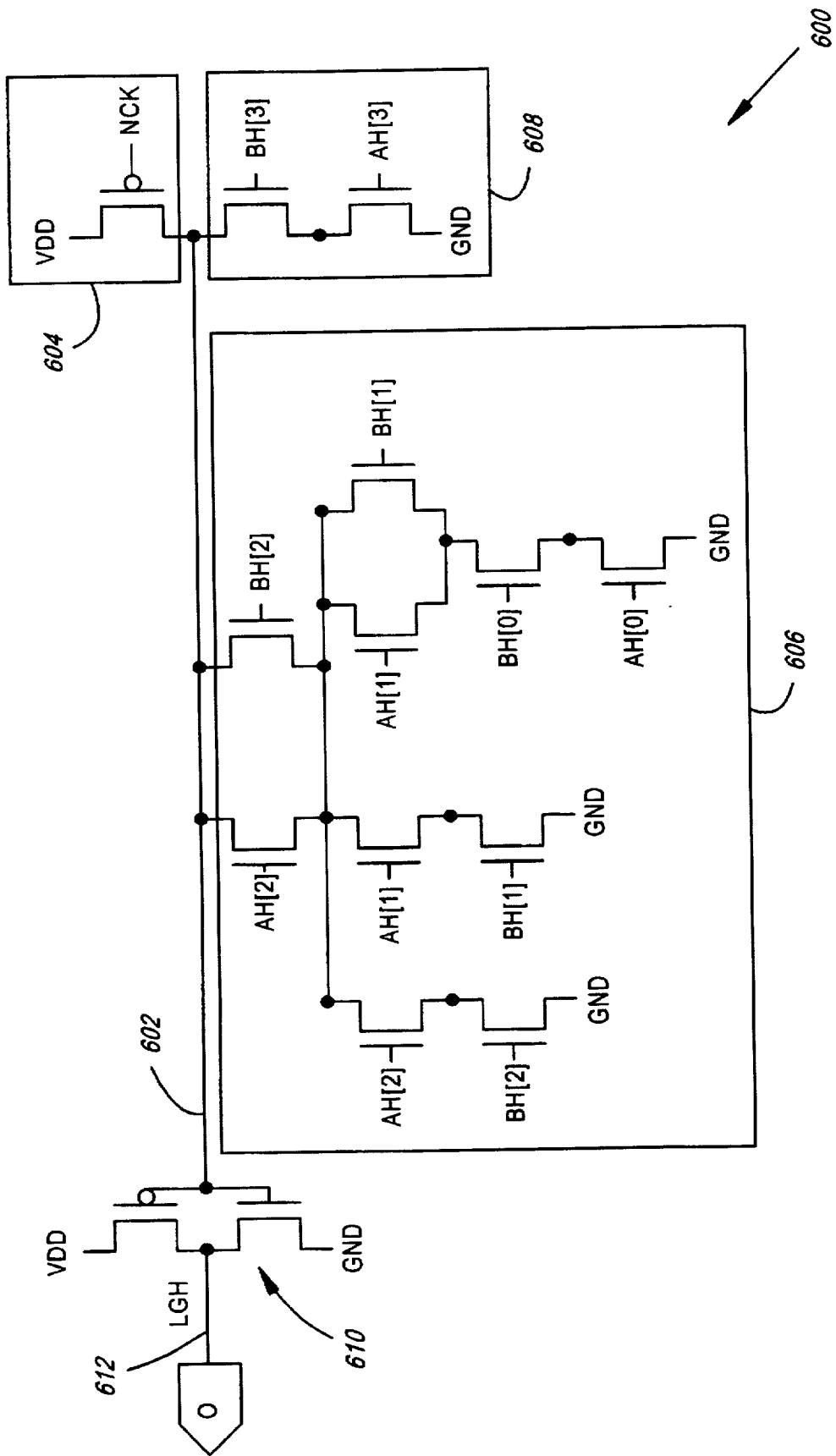
FIG. 6 is a schematic illustrating an alternative circuit for generating a group of four Ling pseudo-carry.

The initial stage 308 of the adder 200 generates 402 (FIG. 4) Ling pseudo-carries 502, FIG. 5, for groups of N bits 322–328, local propagate terms 702 for groups of M bits 330–336, and single bit Propagate 802, Generate 804 and Kill 806 terms 316–320. All of these terms 502, 702, 802–806 can be generated in parallel directly from the operand inputs 302, 304.

A circuit 500, 322–328 for generating a high rail component of a Ling pseudo-carry 502 is shown in FIG. 5. The circuit 500 comprises first 504 and second 506 circuit nodes. Respectively attached to the first 504 and second 506 circuit nodes are first 508 and second 510 arming mechanisms, and first 512 and second 514 logic blocks. First 516 and second 518 inverting buffer mechanisms are connected to the first circuit node 504, and a third inverting buffer mechanism 520 is attached to the second circuit node 506. The outputs 522, 526 of the first 516 and third 520 inverting buffer mechanisms are wired together to produce a Ling pseudo-carry 502 (high rail component) for a group of N bits driving the first 512 and second 514 logic blocks. The output 524 of the second inverting buffer mechanism 518 produces the high rail component of an N−1 bit (i.e., three bit) generate term corresponding to the N−1 less significant bits (i.e., bits 0–3)

of a group of N. The three bit generate term, LG3, may be advantageously used in later stages 338 (FIG. 3) of the adder 200. Each of the arming mechanisms 508, 510 comprises a powered pfet 568, 570 (p-channel field effect transistor) while each of the logic blocks 512, 514 comprises a plurality of nfets 532–550, 554–556 (n-channel fets). (NOTE: As used herein, a powered fet is one having either its source or drain connected to a power source, and a grounded fet is one having either its source or drain connected to ground. Furthermore, a fet is "driven" by the signal applied to its gate.) When a low clock signal, NCK, drives an arming mechanism 508, 510, the mechanism 508, 510 will precharge its respective circuit node 504, 506 (i.e., pull the node 504, 506 to a logic high). When the precharge clocks, NCK, transcend high, the arming mechanisms 508, 510 are disabled and the Ling pseudo-carry circuit 500 is left in an "armed" state. That is, its first 504 and second 506 circuit nodes are susceptible to being pulled down by the first 512 and second 514 logic blocks, thereby generating valid circuit outputs 502, 524. (NOTE: As referred to herein, NCK and CK are substantially complimentary clocks, each alternating between high and low levels and having an approximate 50% duty cycle. VDD, as will later be referred to, is synonymous with a powered connection, and GND is synonymous with a grounded connection.)

The first logic block 512 comprises multiple pulldown legs attached to the first circuit node 504. A pair of parallel connected nfets 532, 534 driven by signals AH[2] and BH[2] are connected between the first circuit node 504 and a first intermediate node 528. Series connected nfets 536, 538 driven by signals AH[2] and BH[2] are connected between the first intermediate node 528 and ground. Series connected nfets 540, 542 driven by signals AH[1] and BH[1] are also connected between the first intermediate node 528 and ground. Parallel connected nfets 544, 546 driven by signals AH[1] and BH[1] are connected between the first intermediate node 528 and a second intermediate node 530. Series connected nfets 550, 548 driven by signals AH[0] and BH[0] are connected between the second intermediate node 530 and ground. In this manner, the first logic block 512 evaluates the high rail component of the function:

$$G[2]+P[2]\cdot G[1]+P[2]\cdot P[1]\cdot G[0],$$

where, as earlier defined, G[I] is equal to the logical AND of bits A[I] and B[I] and P[I] is equal to the logical OR of bits A[I] and B[I].

Due to parasitic capacitances pulling on the intermediate nodes 528, 530 of the Ling pseudo-carry circuit 500, additional prechargers may be connected to those nodes 528, 530. However, unlike the primary arming mechanisms 508, 510, the additional prechargers may comprise an nfet 552 driven by the inversion of the clock signal driving the first arming mechanism, CK. In the illustrated embodiment of the circuit 500, an additional precharger is not included at the second intermediate node 530 due to minimal parasitic affects at that node 530.

The second logic block 514 comprises series connected nfets 554, 556 driven by signals A H[3] and BH[3]. These fets 554, 556 are connected between the second circuit node 506 and ground. In this manner, the second logic block 514 evaluates the term G[3].

The wired connection between the outputs 522, 526 of the first 516 and third 520 inverting buffer mechanisms therefore produces the high rail component of a Ling pseudo-carry 502:

$$LGH=G[3]+G[2]+P[2]\cdot G[1]+P[2]\cdot P[1]\cdot G[0],$$

and the second inverting buffer mechanism 518 outputs the high rail component of an N–1 bit generate term 524:

$$LG3H=G[2]+P[2]\cdot G[1]+P[2]\cdot P[1]\cdot G[0].$$

Although not preferred, the outputs 522, 526 of the first 516 and third 520 inverting buffer mechanisms may be alternatively ORed using a conventional CMOS OR logic gate.

Though each of the inverting buffer mechanisms 516–520 could be implemented as a distinct CMOS inverter (i.e., an inverter comprising a powered pfet and a grounded nfet, the fets being driven by a common signal), it is preferred that the mechanisms 516–520 are interconnected as shown in FIG. 5. The first 516 and second 518 inverting buffer mechanisms are interconnected in that each comprises a powered pfet 558, 560, but shares a common grounded nfet 562. The third inverting buffer mechanism 520 is interconnected with the first 516 and second 518 inverting buffer mechanisms in that it comprises a powered pfet 564, but its nfet 566 is connected between its powered pfet 564 and the grounded nfet 562 shared by the first 516 and second 518 inverting buffer mechanisms. Interconnection of the inverting buffer mechanisms 516–520 is preferred in that 1) it avoids drive fights at the Ling pseudo-carry output 502, and 2) an entire nfet is eliminated. Without the interconnection of the third inverting buffer mechanism, skew of the clock signal, NCK, driving the arming mechanisms 508, 510 could result in a drive fight for control of the Ling pseudo-carry output 502. Elimination of an nfet in each occurrence of the Ling pseudo-carry circuit 500 in a 64 bit adder 200 results in the elimination of 32 fets.

A circuit for generating the low rail component of a group of N Ling pseudo-carry would be substantially the same as the circuit 500 shown in FIG. 5. However, one necessary change would comprise substituting AL[I] and BL[I] logic for the AH[I] and BH[I] logic of FIG. 5. The outputs of a low rail Ling pseudo-carry circuit will be referred to herein as LGL[I] (the low rail component of a Ling pseudo-carry), and LG3L[I] (the low rail component of an N–1 bit generate term).

As will be described in detail herein, N–1 bit generate terms may be used during local carry propagation 338 to absorb propagate terms missing from the N bit Ling pseudo-carries 502. However, if Ling's equations are implemented in a conventional manner, with missing propagate terms being attributed to the SUM 306, the circuit 600 of FIG. 6 may be used to generate the high rail component of a single Ling pseudo-carry, LGH 612. Note that the circuit 600 is simpler than the circuit 500 of FIG. 5 in that an arming mechanism 604 and first 606 and second 608 logic blocks are connected to a single circuit node 602 which is input to an inverting buffer mechanism 610 to derive the high rail component of the Ling pseudo-carry, LGH 612.

Figure 7:
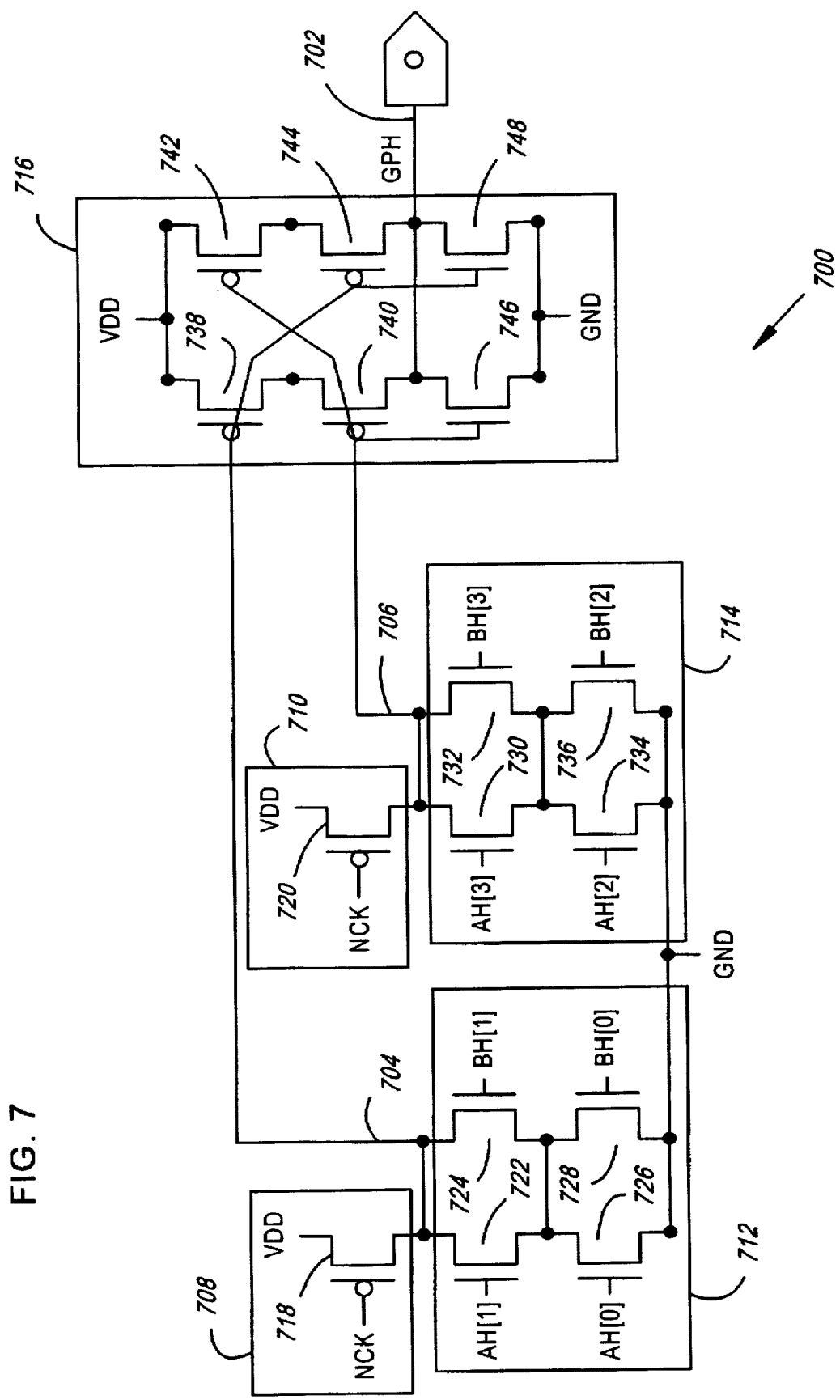
FIG. 7 is a schematic illustrating a circuit for generating a four bit group propagate term, GPH.

In parallel with the generation 402 of Ling pseudo-carries 502, M bit propagate terms 702 are generated 404. A circuit 700, 330–336 for generating the high rail component of an M bit propagate term is shown in FIG. 7. The circuit 700 again comprises first 704 and second 706 circuit nodes. Respectively attached to the first 704 and second 706 circuit nodes are first 708 and second 710 arming mechanisms, first 712 and second 714 logic blocks, and an ANDing buffer mechanism 716. The output 702 of the ANDing buffer mechanism 716 is the high rail component of the M bit propagate term, GPH 702. The arming mechanisms 708, 710 may be identical to those of the Ling pseudo-carry circuits 500, each comprising a powered pfet 718, 720 driven by a clock signal, NCK.

The first logic block 712 comprises parallel connected nfets 722, 724 driven by signals AH[1] and BH[1] connected in series with parallel connected nfets 726, 728 driven by signals AH[0] and BH[0]. The entire first logic block 712 is connected between the first circuit node 704 and ground. The first logic block 712 therefore produces the high rail component of the function P[1]·P[0].

The second logic block 714 comprises parallel connected nfets 730, 732 driven by signals AH[3] and BH[3] connected in series with parallel connected nfets 734, 736 driven by signals AH[2] and BH[2]. The entire second logic block 714 is connected between the second circuit node 706 and ground. The second logic block 706 therefore produces the high rail component of the function P[3]·P[2].

The ANDing buffer mechanism 716 has inputs derived from each of the first 704 and second 706 circuit nodes such that its output 702 is the high rail component of the M bit group propagate term,

GPH=P[3]·P[2]·P[1]·P[0].

Note that the least significant group of M in QUAD-RANT0 202 of the adder 200 will not have access to AH[0] or BH[0] signals. In that instance of the group propagate circuit 700, the gates of the nfets 726, 728 driven by these signals may be wired to power so as to produce a P[3]·P[2]·P[1] output. Alternatively, the extraneous nfets 726, 728 could be eliminated from the first logic block 712 of that circuit.

The ANDing buffer mechanism 716 comprises a first pair of series connected pfets 738, 740, one 738 of which has a source/drain power connection and a gate connected to the first circuit node 704, and one 740 of which has a source/drain connected to the output 702 of the ANDing buffer mechanism 716 and a gate connected to the second circuit node 706. The ANDing buffer mechanism 716 also comprises a second pair of series connected pfets 742, 744, one 742 of which has a source/drain power connection and a gate connected to the second circuit node 706, and one 744 of which has a source/drain connected to the output 702 of the ANDing buffer mechanism 716 and a gate connected to the first circuit node 704. The ANDing buffer mechanism 716 further comprises a pair of nfets 746, 748 connected in parallel between the mechanism's output 702 and ground. One of the nfets 748 is driven by the first circuit node 704, and the other 746 is driven by the second circuit node 706. Although it is not essential that the ANDing buffer mechanism 716 comprise first and second pairs of series connected pfets, the two pairs of series connected pfets offer a slight speed advantage over only a single pair of series connected pfets.

A circuit for generating the low rail component of an M bit propagate term 702 would be substantially the same as the circuit shown in FIG. 7. One necessary change would comprise substituting AL[I] and BL[I] logic for the AH[I] and BH[I] logic. The output of a low rail M bit propagate circuit will be referred to as GPL.

Figure 8:
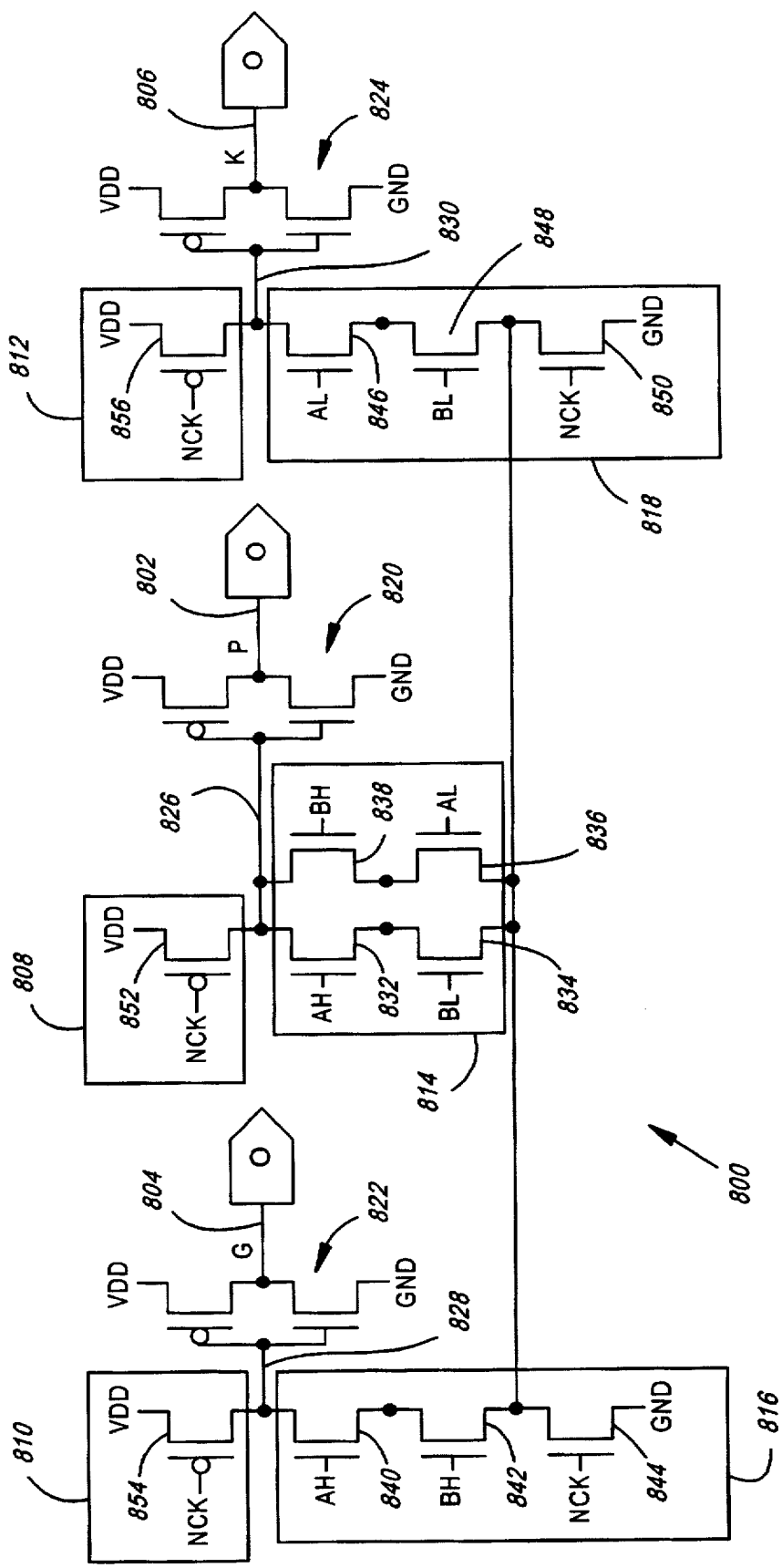
FIG. 8 is a schematic illustrating a circuit for generating single bit propagate, generate, and kill, terms (P, G, and K terms)

In parallel with both the N bit Ling pseudo-carry 502 and M bit propagate term 702 generation 402, 404, single bit Propagate, P 802, Generate, G 804, and Kill, K 806, terms are also generated 406. A circuit 800, 316-320 for generating single bit P 802, G 804 and K 806 terms directly from the input operands 302, 304 is illustrated in FIG. 8. Each single bit P, G, or K term 802-806 is generated via a circuit comprising an arming mechanism 808-812, a pulldown logic block 814-818, and an inverting buffer mechanism 820-824 connected to a common node 826-830. Each arming mechanism 808-812 comprises a powered pfet 852-856 which is triggered by a clock signal, NCK.

The logic block 814 connected to the Propagate node 826 comprises two legs. The first leg comprises series connected nfets 832, 834 driven by signals AH and BL of a single bit position. The second leg comprises series connected nfets 836, 838 driven by signals AL and BH. In this manner, the function P[I]=A[I]⊕B[I] is implemented at the output 802 of the inverting buffer mechanism 820.

The logic block 816 connected to the Generate node 828 comprises a single pulldown leg of series connected nfets 840, 842 driven by signals AH and BH. In this manner, the function G[I]=A[I]·B[I] is implemented at the output 804 of the inverting buffer mechanism 822. The logic block 818 connected to the Kill node 830 is the inverse of the Generate pulldown leg and comprises series connected nfets 846, 848 driven by signals AL and BL. The output 806 of the Kill circuit's inverting buffer mechanism 824 therefore corresponds to the function K[I]=~A[I]·~B[I]. Note that the dual rail nature of the adder allows for easy generation of the P, G and K terms with minimal loading of the operand input signal lines.

The pulldown legs of the P, G and K logic blocks 814–818 may be connected to ground via nfets 844, 850 driven by the signal driving the arming mechanisms 808–812, NCK. Use of the additional nfets 844, 850 prevents drive fights over the P, G and K circuit nodes 826–830 should the A and B inputs arrive at their respective transistor gates prior to clock signal NCK completing a precharge period and transcending high.

Figure 9:
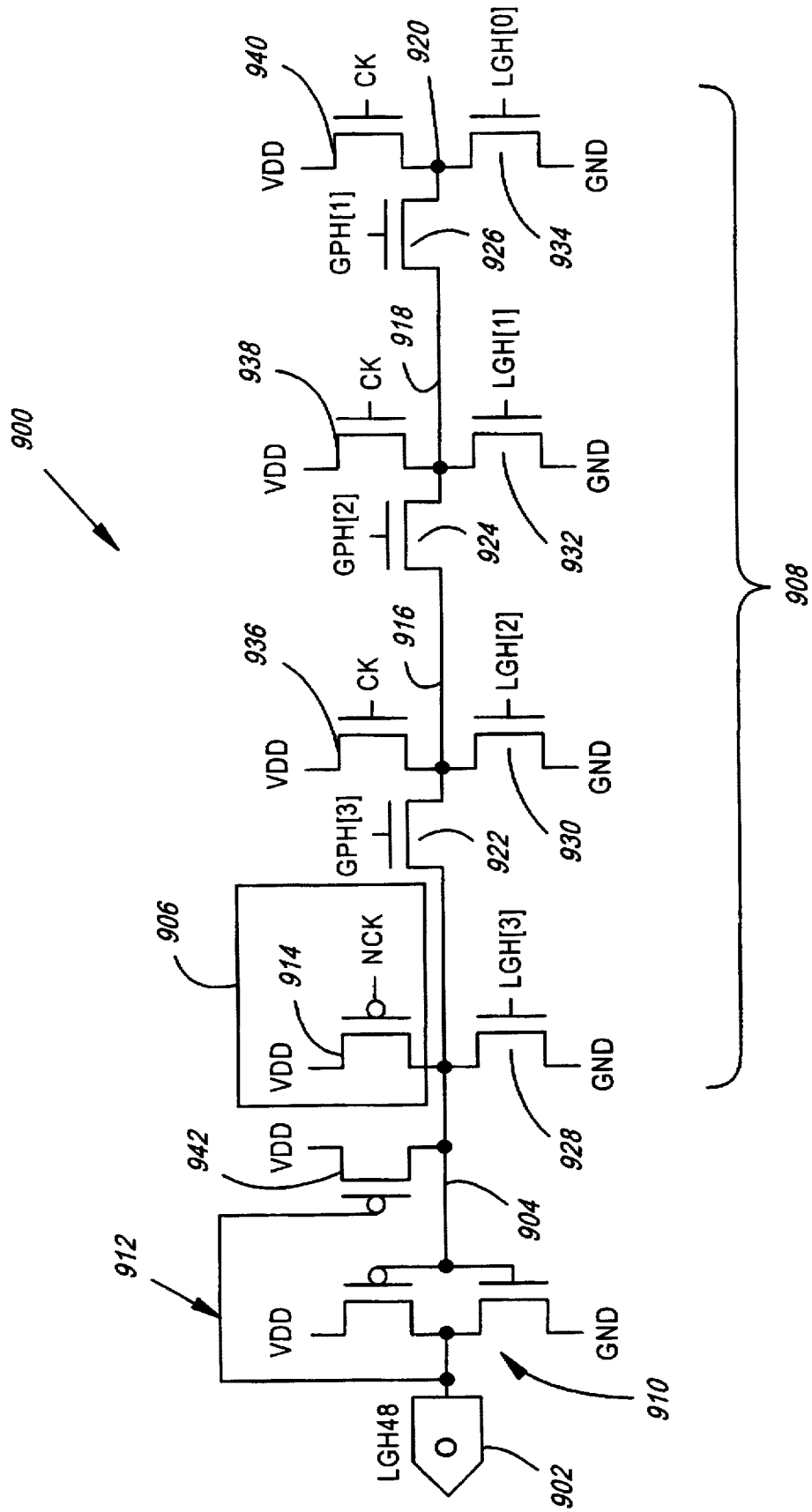
FIG. 9 is a schematic illustrating a Manchester carry chain for generating a Ling pseudo-carry, LGH48, out of an adder quadrant.
Figure 10:
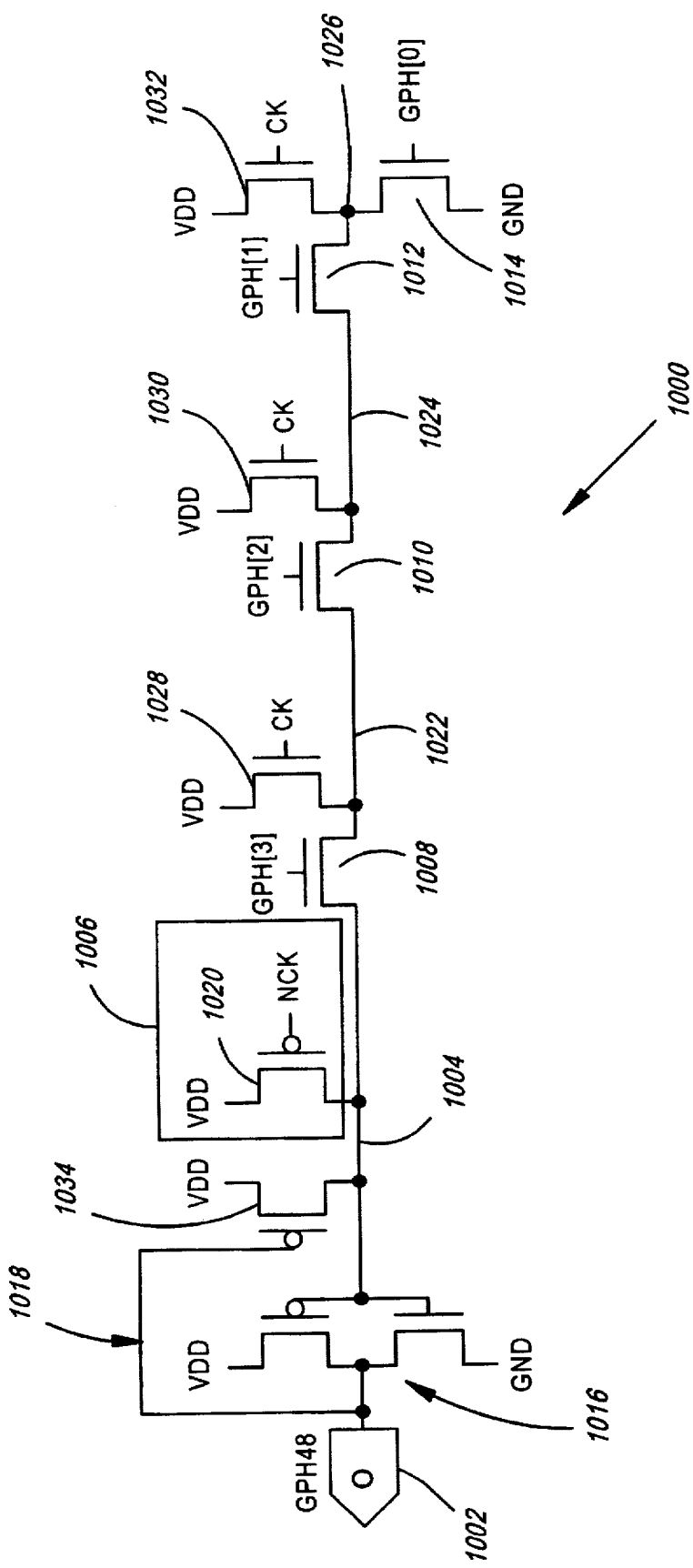
FIG. 10 is a schematic illustrating a circuit for generating a quadrant-wide propagate term, GPH48.
Figure 11:
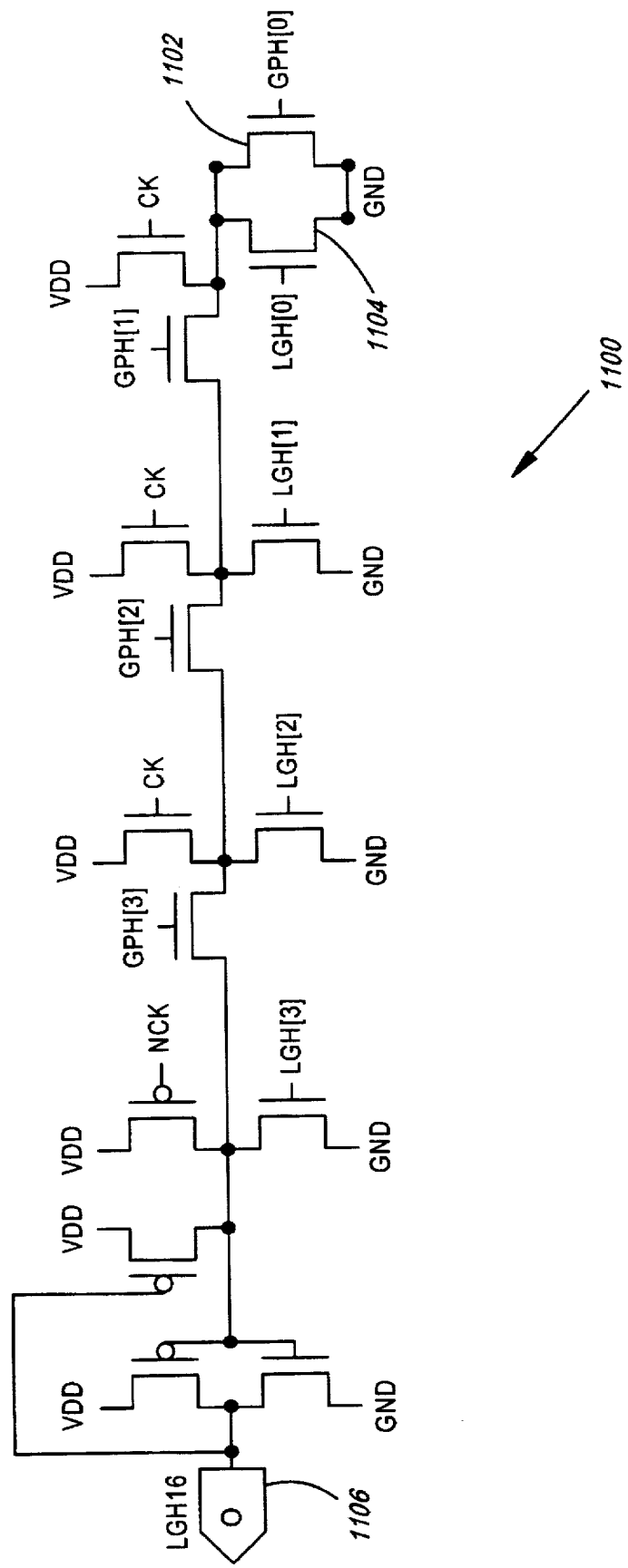
FIG. 11 is a schematic illustrating a Manchester carry chain for generating a Ling pseudo-carry, LGH16, out of an adder's least significant quadrant.

In the second stage 310 of the adder 200, higher order Ling pseudo-carries 902 and group propagate terms 1002 (i.e., 16 bit terms or "quadrant terms") are generated 408 from the lower order Ling pseudo-carries 502 and group propagate terms 702. Higher order terms 902, 1002 need only be generated in the lower three quadrants 202–206 of the adder 200. Higher order terms 902, 1002 may be generated using Manchester carry chains 900, 1000, 1100, as shown in FIGS. 9–11. The inputs to each carry chain are the lower order (i.e., 4 bit) Ling pseudo-carries 322–328 and group propagate terms 330–336 of a quadrant 206. For ease of description, the Ling pseudo-carries (LGH and LGL terms) and M bit group propagate terms (GPH and GPL terms) of a particular quadrant 206 will be referred to, from least to most significant, as terms 0 through 3 (see 322-328 and 330-336, FIG. 3).

FIG. 9 shows a circuit used to generate the high rail component of a higher order Ling pseudo-carry 902 carried out of the second 204 or third 206 quadrants of the adder (terms LGH32 and LGH48). The circuit 900 comprises a primary circuit node 904 to which connects a primary arming mechanism 906, a Manchester carry chain 908, an inverting buffer mechanism 910, and output feedback 912. The primary arming mechanism 906 comprises a powered pfet 914 driven by a clock signal, NCK.

The Manchester carry chain 908 comprises first 916, second 918 and third 920 intermediate nodes. The primary node 904 and first through third intermediate nodes 916–920 are respectively linked by three nfets 922–926 driven by lower order group propagate terms GPH[3], GPH[2] and GPH[1] 330–336. Respectively attached to the primary node 904 and first through third intermediate nodes 916–920 are grounded nfets 928–934 driven by lower order Ling pseudo-carry terms LGH[3], LGH[2], LGH[1] and LGH[0] 322–328. To combat the effects of parasitic capacitance, secondary arming mechanisms are connected to each of the first through third intermediate nodes 916–920. Each of the secondary arming mechanisms comprises a powered nfet 936–940 driven by the inverse of the clock signal driving the primary arming mechanism 906. The inverting buffer mechanism 910 comprises a standard nfet/pfet CMOS buffer, the output of which is a higher order Ling pseudo-carry 902.

The output feedback 912 comprises an additional powered pfet 942 connected to the primary circuit node 904. The additional pfet 942 is driven by the circuit's output 902.

A circuit for generating the low rail component of a higher order Ling pseudo-carry would be substantially the same as the circuit shown in FIG. 9. A necessary change would comprise substituting LGL and GPL logic for the LGH and GPH logic. The low rail outputs of a higher order Ling pseudo-carry circuit corresponding to the second or third quadrants will be referred to as LGL32 or LGL48.

FIG. 10 shows a circuit 1000 used to generate the high rail component of a higher order group propagate term 1002 of the second 204 or third 206 quadrants of the adder (terms GPH32 and GPH48). The circuit 1000 comprises a primary circuit node 1004 to which connects a primary arming mechanism 1006, a chain of series connected nfets 1008–1014, an inverting buffer mechanism 1016, and output feedback 1018. The primary arming mechanism 1006 again comprises a powered pfet 1020 driven by a clock signal, NCK.

The chain of series connected nfets comprises four nfets 1008–1014 connected between the primary circuit node 1004 and ground. The nfets 1008–1014 are driven by respective 4 bit propagate terms 330–336 of a particular adder quadrant 206 (i.e., terms GPH[3], GPH[2], GPH[1] and GPH[0]). The nfet chain 1008–1014 comprises three intermediate nodes 1022–1026. Again, a secondary arming mechanism comprising a powered nfet 1028–1032 driven by the inverse of the clock signal driving the primary arming mechanism 1006 is connected to each of the three intermediate nodes 1022–1026.

As in the higher order Ling pseudo-carry circuit 900, the output feedback 1018 comprises an additional powered pfet 1034 connected to the primary circuit node 1004. The additional pfet 1034 is driven by the circuit's output 1002.

A circuit for generating the low rail component of a higher order group propagate term would be substantially the same as the circuit 1000 shown in FIG. 10. A necessary change would comprise substituting GPL logic for the GPH logic. The low rail outputs of a higher order Ling pseudo-carry circuit of the second 204 or third 206 quadrants will be referred to as GPL32 or GPL48.

Note that higher order Ling pseudo-carries and group propagate terms generated from the adder's first quadrant 202 have not yet been accounted for. An additional higher order group propagate circuit 1000 is not needed since there are no pseudo-carries to propagate across the first or least significant quadrant 202. The only term which needs to be propagated across the first quadrant is the carry into the adder 200, if any. Propagation of this term can be accounted for by adding a single nfet 1102 to the FIG. 9 circuit 900. In FIG. 11, it can be seen that the additional nfet 1102 is driven by the GPH[0] term of the adder's least significant quadrant 202, and is connected in parallel with the nfet 1104 driven by the LGH[0] term (the low rail circuit comprises parallel nfets driven by the GPL[0] and LGL[0] terms). The output 1106 of the high rail circuit is designated as LGH16, and the output of the low rail circuit is designated as LGL16.

Ling pseudo-carries out of quadrants 902, 1102 may be combined with quadrant-wide propagate terms 1002 to generate 410 long carries 1202 (i.e., CL16, CL32, and CL48). Long carries 1202 determine the value of a carry into a quadrant 204–208, and can therefore be used in selecting the appropriate sum of a quadrant's bits. In a 64 bit adder 200, long carry CL16 selects the sum of the second quadrant 204, CL32 selects the sum of the third quadrant 206, and CL48 selects the sum of the fourth or upper quadrant 208. A long carry isn't necessary in selecting the sum of the least significant adder quadrant 202, as that sum is determined by the carry into the quadrant 202. Likewise, a long carry 1202 need not be generated "out of" the upper adder quadrant 208 as there is no sum to select beyond 64 bits.

Figure 12:
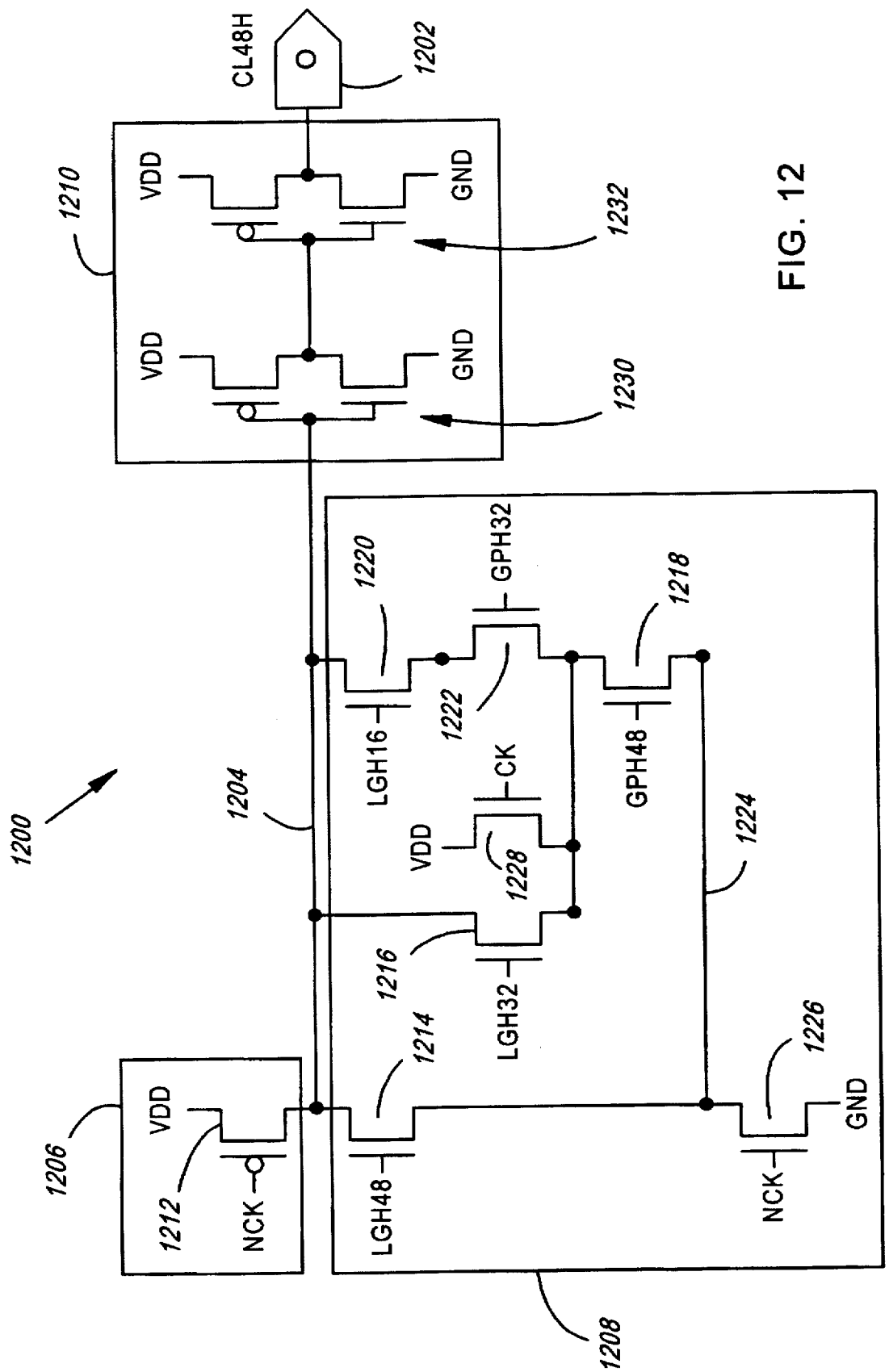
FIG. 12 is a schematic illustrating a circuit for generating a long carry, CL48H, out of a quadrant.

A circuit 1200 for generating the high rail component of a long carry 1202 out of the third adder quadrant 206, CL48H, is shown in FIG. 12. The circuit 1200 comprises a primary circuit node 1204 to which connects a primary arming mechanism 1206, a long carry logic block 1208, and a buffer mechanism 1210. The primary arming mechanism 1206 again comprises a powered pfet 1212 driven by a clock signal, NCK.

The long carry logic block 1208 comprises a plurality of nfets 1214–1222. The Ling pseudo-carry out of the adder's third quadrant 206, LGH48, is carried directly into the adder's most significant quadrant 208 and therefore drives a leg 1214 of the logic block 1208 which is capable of pulling down the primary circuit node 1204. The Ling pseudo-carry out of the adder's second quadrant 204, LGH32, must be propagated across the adder's third quadrant 206 in order to generate a carry into the adder's most significant quadrant 208. An nfet 1216 driven by the Ling pseudo-carry out of the adder's second quadrant 204 connected in series with an nfet 1218 driven by the third quadrant's propagate term, GPH48, serves as a second pulldown leg on the primary circuit node 1204. Finally, the Ling pseudo-carry out of the first quadrant, LGH16, drives an nfet 1220 connected in series with nfets 1222, 1218 driven by the second and third quadrant's propagate terms, GPH32 and GPH48. In this manner, a third leg of the logic block 1208 is capable of pulling down the primary circuit node 1204. The three pulldown legs, 1214, 1216/1218, and 1220/1222/1218, may be connected directly between the primary circuit node 1204 and ground, or alternatively, may be connected to ground via an nfet 1226 driven by the clock signal driving the primary arming mechanism 1206. The additional nfet path 1226 enables timely reset (i.e., precharging) of the FIG. 16 summing circuits. The high rail component of a long carry, as implemented by the FIG. 12 long carry logic block 1208, is therefore defined as:

$$CL48H = LGH48 + LGH32 \cdot GPH48 + LGH16 \cdot GPH32 \cdot GPH48.$$

Additional nfet prechargers 1228 driven by the inverse of the clock signal driving the primary arming mechanism 1206 may be used as needed to counter parasitic capacitance affects within the long carry logic block 1208.

The buffer mechanism 1210 comprises back to back inverting CMOS buffers 1230, 1232.

A circuit for generating the low rail component of a long carry would appear substantially as shown in FIG. 12. However, the long carry logic block of such a circuit would be driven by low rail logic, and the output of the circuit would be the low rail component of a long carry (i.e., LGL16, LGL32, LGL48).

In parallel with 1) the generation 408 of higher order Ling pseudo-carries 902, 1102 and group propagate terms 1002, and 2) the generation 410 of long carries 1202, a dual carry ripple 412, 414 is performed within each quadrant 202-208. A dual carry ripple 412, 414 comprises a first carry ripple 412 performed under the assumption of a "0" carry into a quadrant, and a second carry ripple 414 performed under the assumption of a "1" carry into a quadrant.

Rather than attempting to absorb the missing propagate terms of the low order Ling pseudo-carries, and "converting" the Ling pseudo-carries into real carries (as Ling's equations teach), carry propagation is shifted down by one bit, and real carries are derived from the N−1 bit generate terms which were produced as a byproduct of the Ling pseudo-carry circuits 322–328.

The dual carry ripple within a quadrant 202–208 is divided into two dual carry ripples 412, 414 which are performed substantially in parallel. The first dual carry ripple 412 is used to propagate real carries, C[I], into the most significant bits of groups of N. In the adder quadrant 206 of FIG. 3, the first dual carry ripple 412 is accomplished by a plurality of dynamic CMOS logic circuits 344–350 which generate C[35], C[39], C[43] and C[47] (each of the carries comprising a C0H, C0L, C1H and C1L counterpart). Carry C[39] is generated from C[35], C[43] is generated from C[39], and so on in a ripple fashion. Terms which are required to transform the N−1 bit generate terms into real carries are absorbed by this circuitry 344–350.

The second dual carry ripple 414 is used to propagate real carries, C[I], into the less significant N−1 bits of each group of N. In the quadrant 206 of FIG. 3, the second dual carry ripple is accomplished by a plurality of dynamic CMOS logic circuits 352–358 which generate the carries into bits 32–34, 36–38, 40–42, and 44–46. Again, each of the carries comprises a C0H, C0L, C1H and C1L counterpart. The second dual carry ripple 414 is performed substantially parallel with the first dual carry ripple 412, but is dependent thereon. For example, the circuitry 356 which generates carries C0[38:36] and C1[38:36] is dependent on the circuitry 350 which generates dual carry C0[35]/C1[35].

Figure 13:
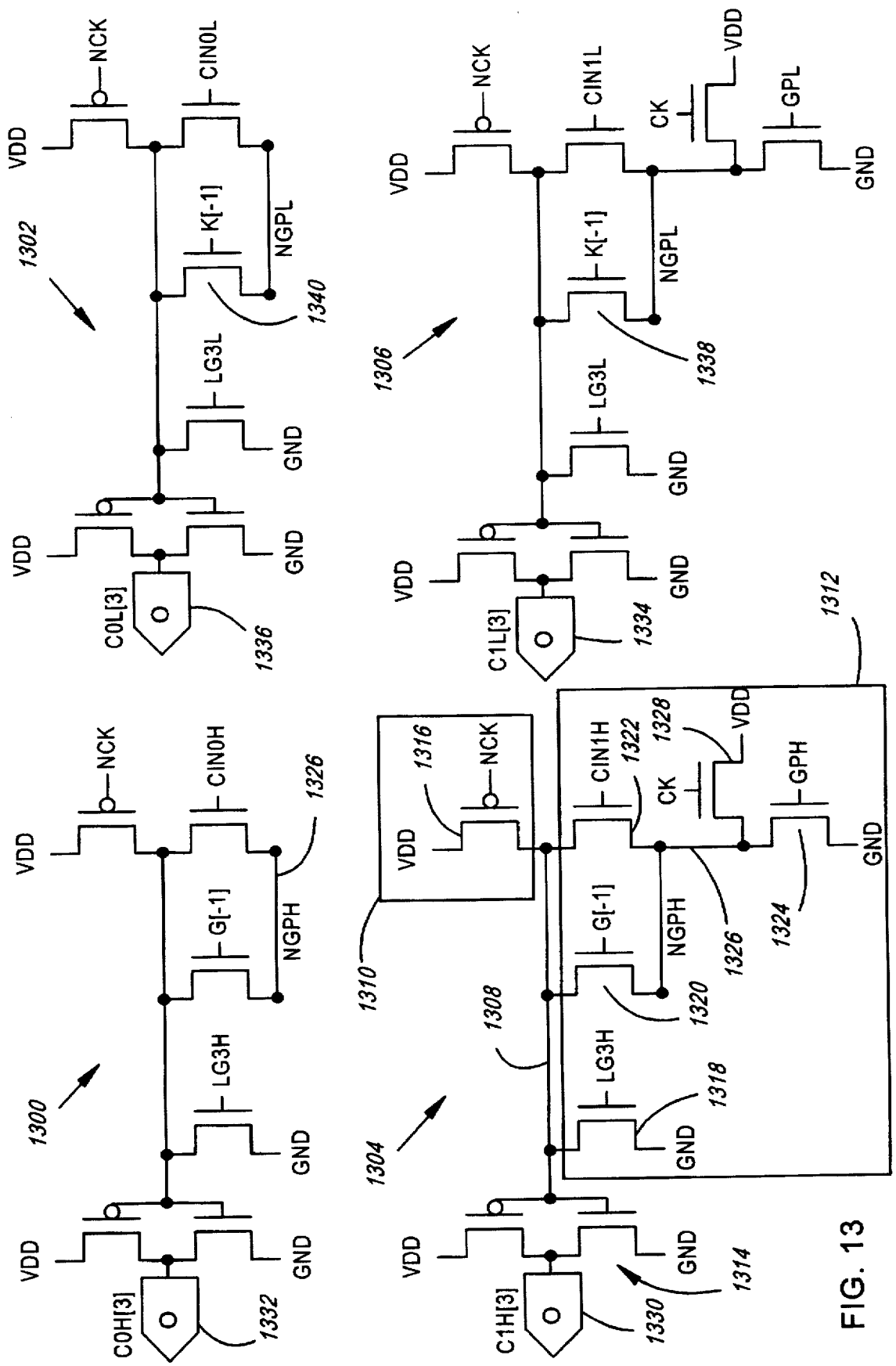
FIG. 13 is a schematic illustrating circuits for propagating dual carries among the most significant group of four bits in an adder quadrant.

Circuitry 1300–1306 for accomplishing the first carry ripple is shown in FIG. 13. The circuitry 1300–1306 comprises four similar pieces. Two of the pieces 1300, 1302 propagate a carry based on the assumption of a "0" carry into a quadrant 206, and two of the pieces 1304, 1306 propagate a carry based on the assumption of a "1" carry into a quadrant 206. The two pieces used to propagate a carry correspond to the high and low rail components of the carry.

The high rail component 1304 of the propagation circuit which assumes a carry of "1" into the quadrant 206 is instructive of the operation of the circuit 1300–1306 as a whole. This particular piece of the circuit 1304 comprises a primary circuit node 1308 to which connects a primary arming mechanism 1310, a carry propagation logic block 1312, and a buffer mechanism 1314. The primary arming mechanism 1310 again comprises a powered pfet 1316 driven by a clock signal, NCK.

The carry propagation logic block 1312 uses nfets 1318–1324 to implement the function:

C1H[3]=LG3H+GPH·(G[−1]+CIN1H), where LG3H is the N−1 bit generate term corresponding to a group of N input bits, GPH is a group of M local propagate term of one bit less significance than the LG3H term, and G[−1] is a single bit generate term corresponding to the group of M local propagate term's least significant bit. Thus, the equation of C1H[3] 1330 may be expanded to:

$$C1H[3] = G[2] + P[2] \cdot G[1] + P[2] \cdot P[1] \cdot G[0] +$$
$$P[2] \cdot P[1] \cdot P[0] \cdot P[-1] \cdot G[-1] +$$
$$P[2] \cdot P[1] \cdot P[0] \cdot P[-1] \cdot CIN1H.$$

Realizing that G[−1] implies P[−1], and that CIN1H is equivalent to C[−1] (since CIN1H is a real carry propagated into the most significant bit of a less significant group of N bit), the equation of C1H[3] may be alternately written as:

$$C1H[3] = G[2] + P[2] \cdot G[1] + P[2] \cdot P[1] \cdot G[0] +$$
$$P[2] \cdot P[1] \cdot P[0] \cdot G[-1] +$$
$$P[2] \cdot P[1] \cdot P[0] \cdot P[-1] \cdot C[-1].$$

Note that this equation is nothing more than a shifted equation for a four bit real carry (i.e., C[4]=G[3]+P[3]·G[2] +P[3]·P[2]·G[1]+P[3]·P[2]·P[1]·G[0]+P[3]·P[2]·P[1]·P[0]·C [0]).

The high rail component 1300 of the propagation circuit which assumes a carry of "0" into the quadrant 206 is similar in most respects to the high rail component 1304 of the circuit which assumes a carry of "1" into the quadrant 206, and in fact, the two circuits 1300, 1304 may share node NGPH 1326. However the "0" propagation circuit 1300 will comprise input CIN0H rather than input CIN1H, and will produce output C0H[3] 1332.

An nfet precharger 1328 driven by the inverse of the clock signal driving a propagation circuit's primary arming mechanism 1316 may be connected to the shared node NGPH 1326. Again, the addition of this precharger 1328 is controlled by the need to combat parasitic capacitance affects.

But for having low rail inputs and outputs 1334, 1336, the low rail components 1306, 1302 of the FIG. 13 carry propagation circuit are identical in construction to their high rail counterparts 1304, 1300. Note that the logic of the low rail components 1306, 1302 comprises a K[−1] input 1338, 1340. As earlier discussed, K[I] is merely the logical AND of AL[I] and BL[I], but note that the dual rail nature of the propagation circuitry 1300–1306 allows a kill term, K[I], to be generated without the need for signal inversions (as is currently required within a static CMOS adder).

Figure 14:
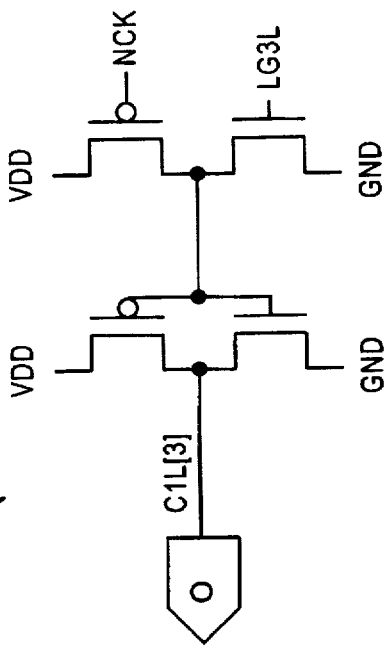
FIG. 14 is a schematic illustrating circuits for propagating dual carries out of the most significant bit of an adder quadrant's least significant group of four bits.
Figure 14:
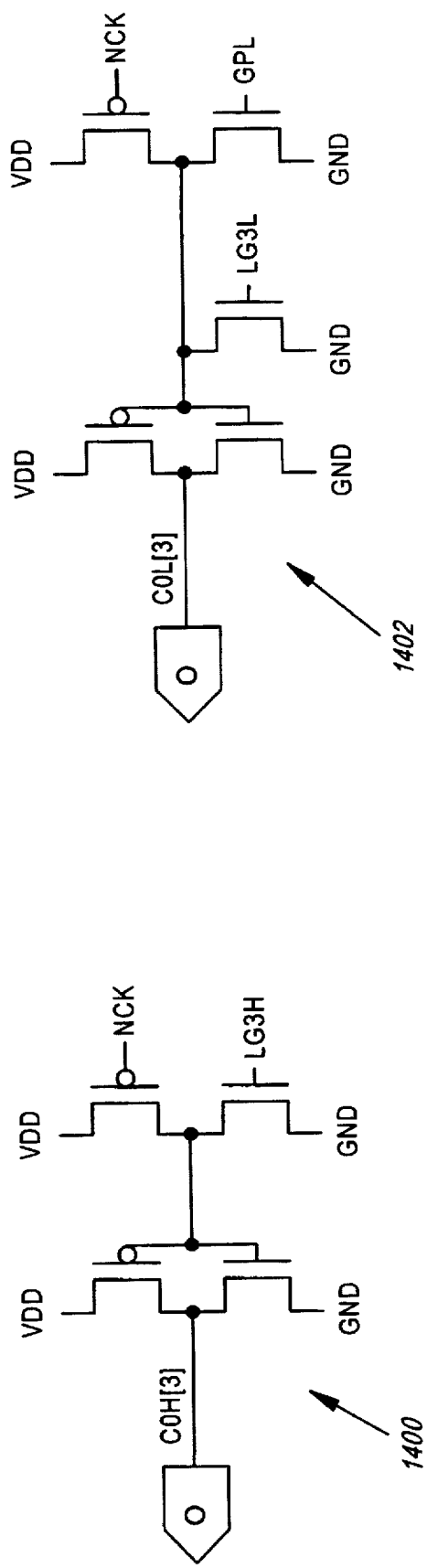
Figure 14:
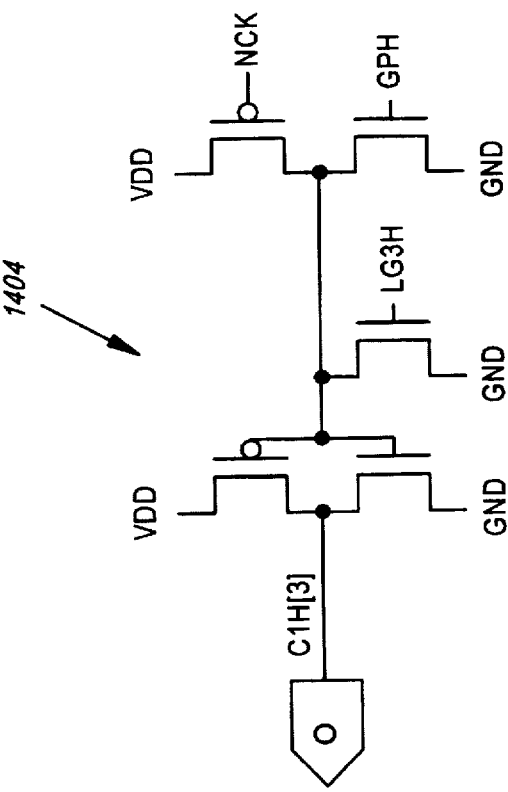

Due to the dual carry propagation being quadrant specific, CIN1H, CIN1L, CIN0H and CIN0L will be constants with respect to the least significant carry propagation circuits 350, 358 of a quadrant 206. The CIN1H and CIN0L inputs of a least significant carry propagation circuit 350 could therefore be wired to power (VDD), and its CIN1L and CIN0H inputs could be wired to ground (GND). Alternatively, the circuit arrangement of FIG. 14 could be implemented. The circuits 1400–1406 of FIG. 14 implement the same functions as the circuits 1300–1304 of FIG. 13. However, nfets which become redundant or immaterial due to the opens and/or shorts created by hardwiring the gates of fets driven by CIN1H, CIN1L, CIN0H and CIN0L have been eliminated. The circuits 1400–1406 of FIG. 14 may therefore be used to generate C0[35] and C1[35] in the third quadrant 206 of the adder 200. Likewise, the circuits 1400–1406 could be used to generate C0[3]/C1[3], C0[19]/C1[19], and C0[51] /C1[51]in QUADRANT0 202, QUADRANT1 204, and QUADRANT3 208, respectively.

Figure 15:
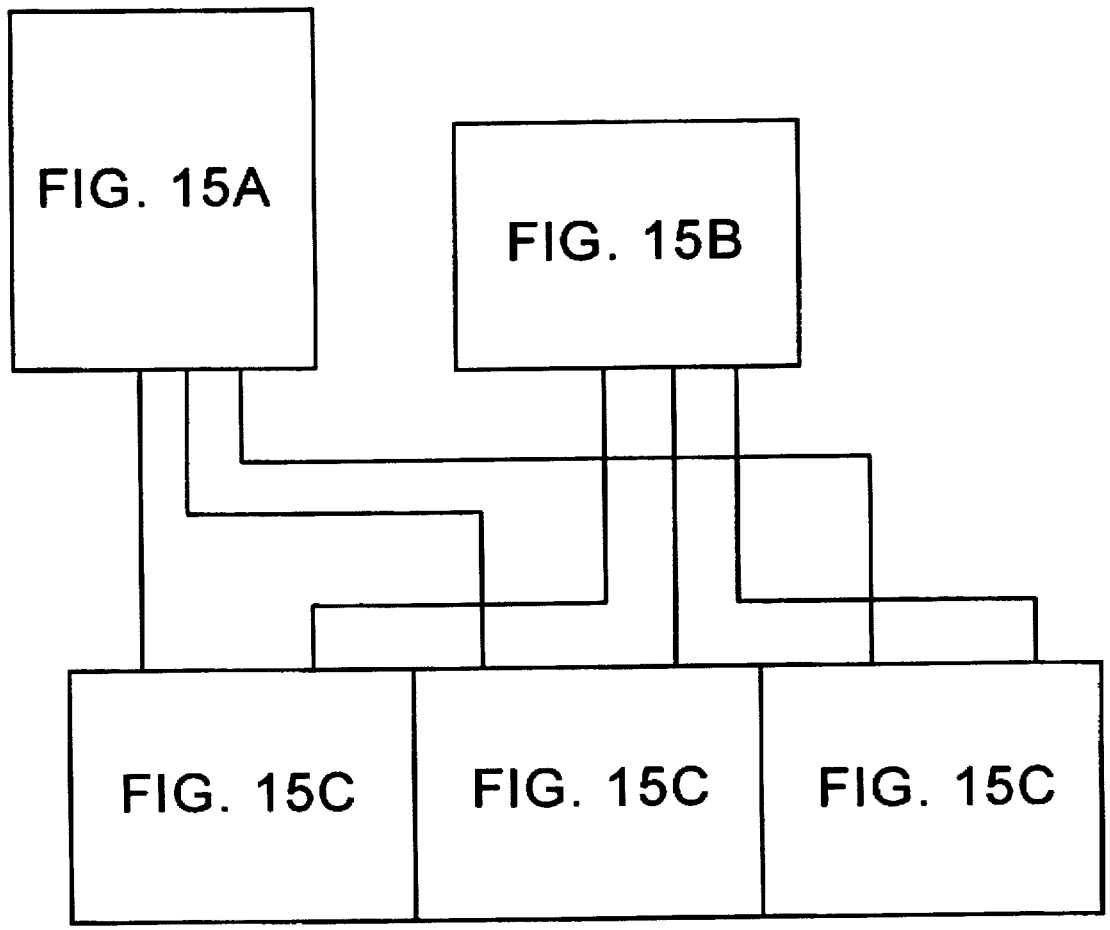
FIG. 15 is a block diagram illustrating the cooperation between the circuits of FIGS. 15A–15C, the combined circuit providing a means to propagate dual carries among the less significant bits of a group of four bits.
Figure 15A:
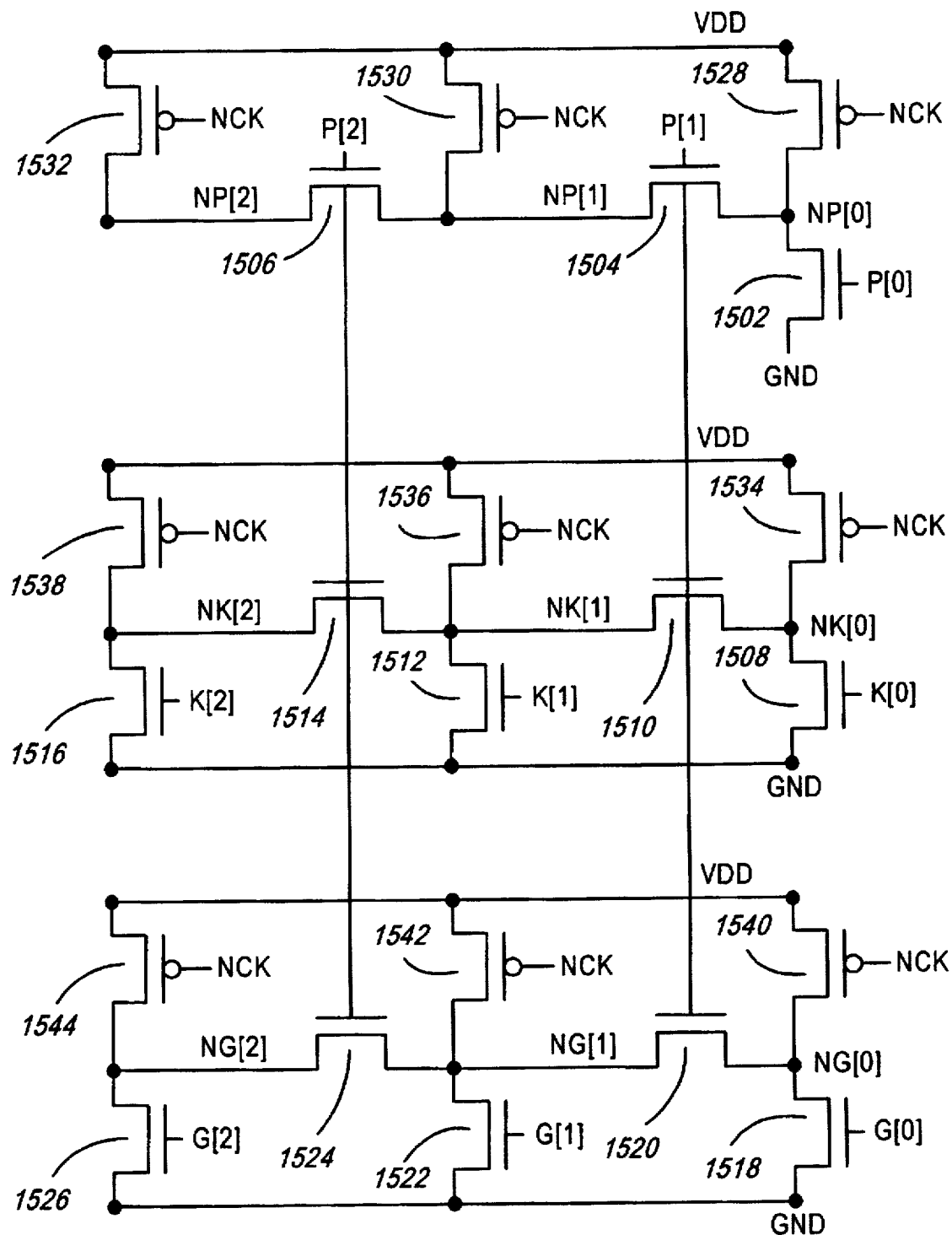
FIG. 15A is a schematic illustrating dependent Manchester carry chains used in the circuit of FIG. 15.

Each circuit of the plurality of dynamic CMOS logic circuits 352–358 used to propagate real carries, C[I], into the less significant N−1 bits of each group of N may be configured as shown in FIG. 15. The dual carry propagation circuit comprises 1) a Manchester carry chain circuit (FIG. 15A), 2) a carry input inversion circuit (FIG. 15B), and 3) N−1 carry generation circuits (FIG. 15C) which are dependent upon outputs of the Manchester carry chain and carry input inversion circuits.

The Manchester carry chain circuit comprises three interrelated Manchester carry chains which are programmed to output one, two and three bit propagate terms (i.e., NP[0], NP[1], NP[2]), generate terms (i.e., NG[0], NG[1], NG[2]) and kill terms (i.e., NK[0], NK[1], NK[2]). Each Manchester carry chain comprises a plurality of nfets 1502–1506, 1508–1516, 1518–1526 driven by the single bit P[I], G[I] and K[I] terms corresponding to the less significant N–1 bits of a particular group of N bits. A primary arming mechanism 1528, 1534, 1540 and various secondary arming mechanisms 1530–1532, 1536–1538, 1542–1544, each comprising a clock driven powered pfet, are used to selectively precharge or evaluate the nfet logic 1502–1526 comprising the Manchester carry chains.

For continuity, each of the carries (i.e., CIN1H, CIN1L, CIN0H, CIN0L) propagated into the less significant N–1 bits of a group of N is inverted 1546–1552, thereby producing outputs NC1H 1558, NC1L 1560, NC0H 1554 and NC0L 1556.

Figure 15B:
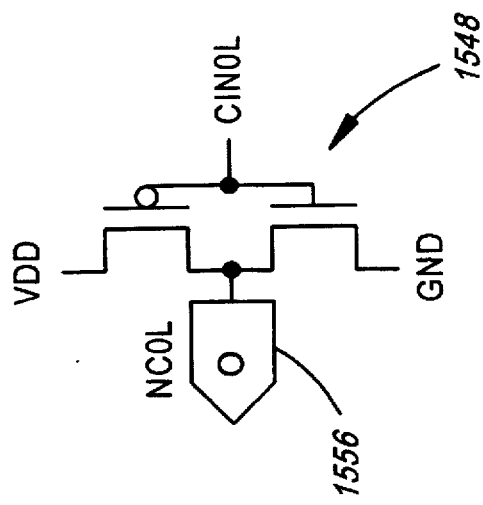
FIG. 15B is a schematic illustrating inverting buffers which may be used in connecting the circuit of FIG. 13 or 14 to the circuit of FIG. 15.
Figure 15B:
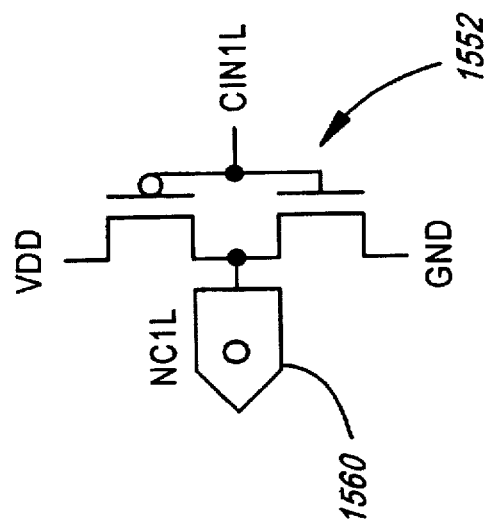
Figure 15B:
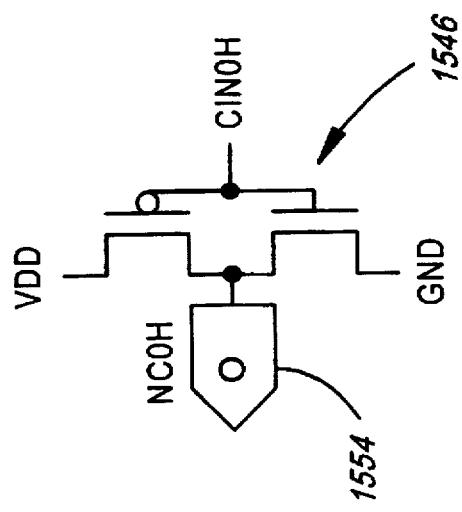
Figure 15B:
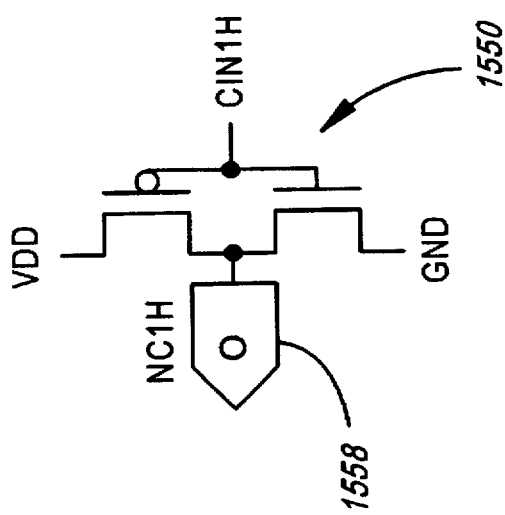
Figure 15C:
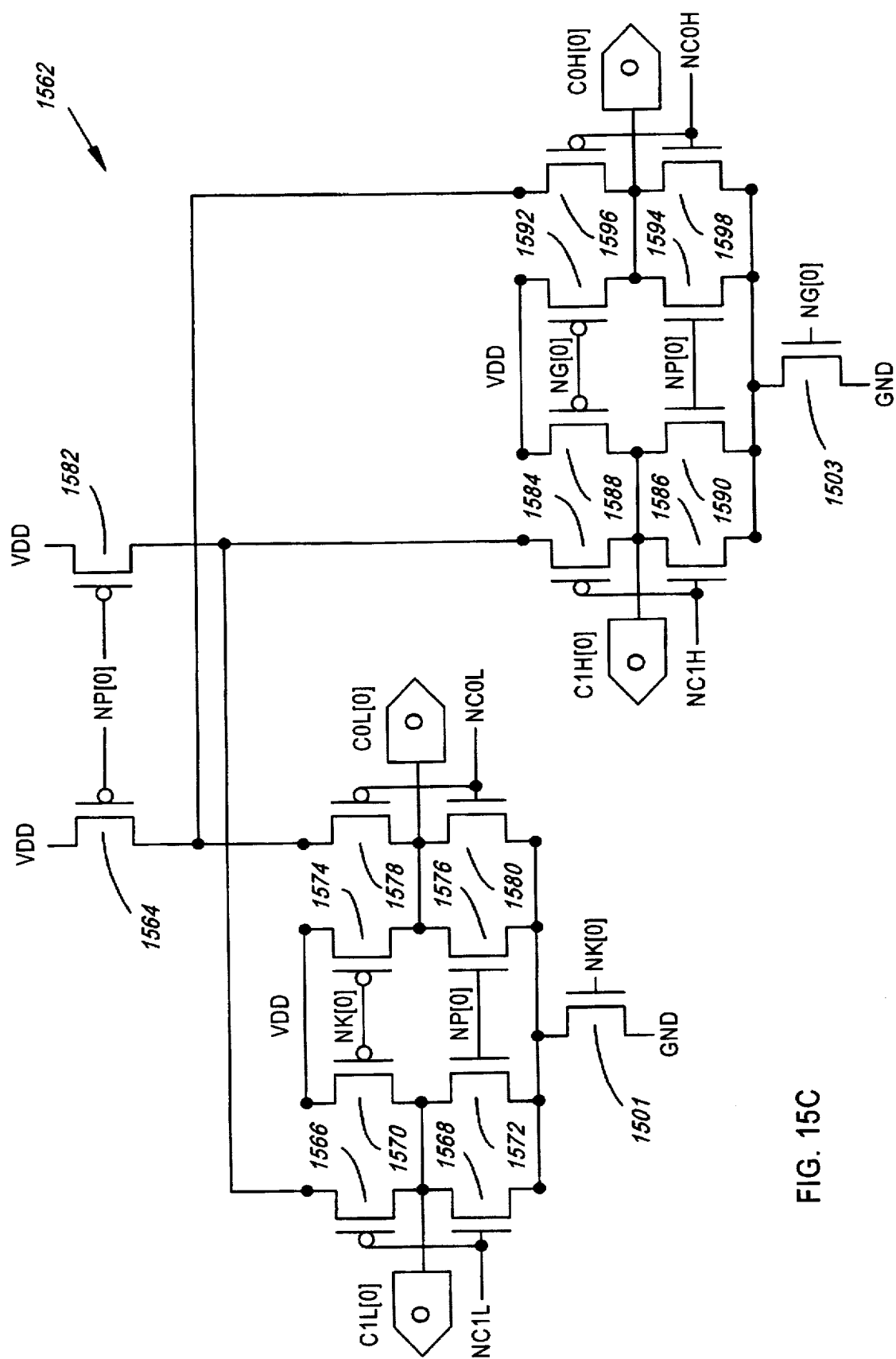
FIG. 15C is a schematic illustrating a carry generation circuit.

Each circuit 352–358 for propagating carries into a group of N's least significant N–1 bits comprises three carry generation circuits 1562. A carry generation circuit 1562 for propagating a carry into a group of N's least significant bit (i.e., bit zero) is illustrated in FIG. 15C. Carry generation circuits for propagating carries into bits one and two of a group of N bits (i.e., group of four bits) would be substantially similar to the circuit of FIG. 15C, but for the fact that inputs and outputs would be designated "[1]" and "[2]", respectively. The circuit 1562 comprises a plurality of fets 1564–1598, 1501, 1503 driven by outputs of the Manchester carry chain (FIG. 15A) and carry input inversion circuits (FIG. 15B).

Having propagated dual carries 412, 414 into each bit of the adder 200, and long carries 410 out of each quadrant 202–206 of the adder 200 (but for the most significant quadrant 208), a sum 306 of the input operands, A 302 and B 304, may now be generated 416. Each bit of the sum 306 is defined as the exclusive OR of corresponding operand and carry bits. However, given the dual rail nature of the adder, each bit of the sum will be defined by the dual quantity:

$$SUMH[I] = AH[I] \oplus BH[I] \oplus C1H[I],$$

and $$SUML[I] = AL[I] \oplus BL[I] \oplus C1L[I],$$

or $$SUMH[I] = AH[I] \oplus BH[I] \oplus C0H[I],$$

and $$SUML[I] = AL[I] \oplus BL[I] \oplus C0L[I].$$

Whether a sum bit is defined by a C0 or C1 carry is determined by carry select lines, SELH 1600 and SELL 1602, corresponding to a given adder quadrant. If a quadrant's SELH line 1600 carries a logic high, the first set of sum equations will determine the values of a quadrant's sum bits (carry in of "1"). If a quadrant's SELL 1602 line carries a logic high, the second set of sum equations will determine the values of a quadrant's sum bits (carry in of "0").

Figure 16:
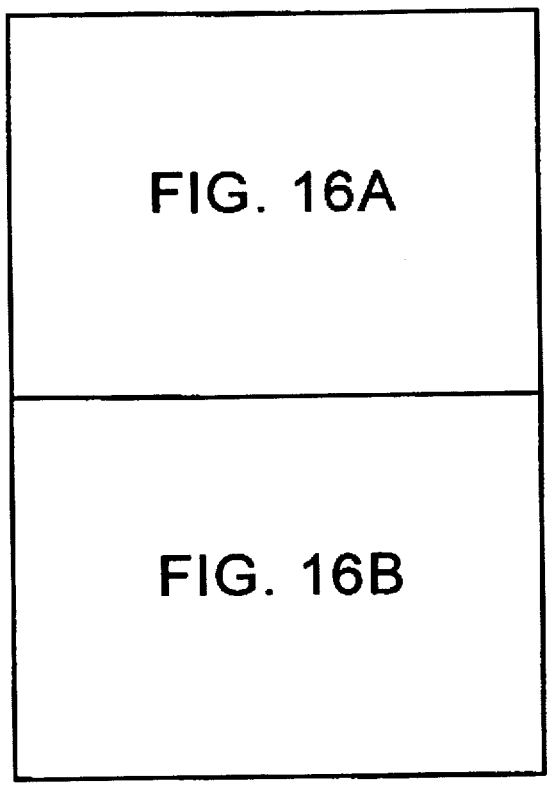
FIG. 16 is a block diagram illustrating the cooperation between the circuits of FIGS. 16A and 16B, the combined circuit providing a means for calculating a dual rail sum bit.

The dynamic CMOS logic circuit of FIG. 16 may be used to generate a single dual rail sum bit. The circuit 1600 comprises first 1604 and second 1606 internal circuit nodes which may be precharged (i.e., pulled invalid) by respective arming mechanisms 1608, 1610. First 1612 and second 1614 dependent logic blocks are used to implement the following equations:

$$SUMH[I] = SELH \cdot (C1H[I] \cdot (K[I] + G[I]) + C1L[I] \cdot P[I]) +$$
$$SELL \cdot (C0L[I] \cdot P[I] + C0H[I] \cdot (K[I] + G[I])),$$

and $$SUML[I] = SELH \cdot (C1L[I] \cdot (K[I] + G[I]) + C1H[I] \cdot P[I]) +$$
$$SELL \cdot (C0H[I] \cdot P[I] + C0L[I] \cdot (K[I] + G[I])).$$

Figure 16A:
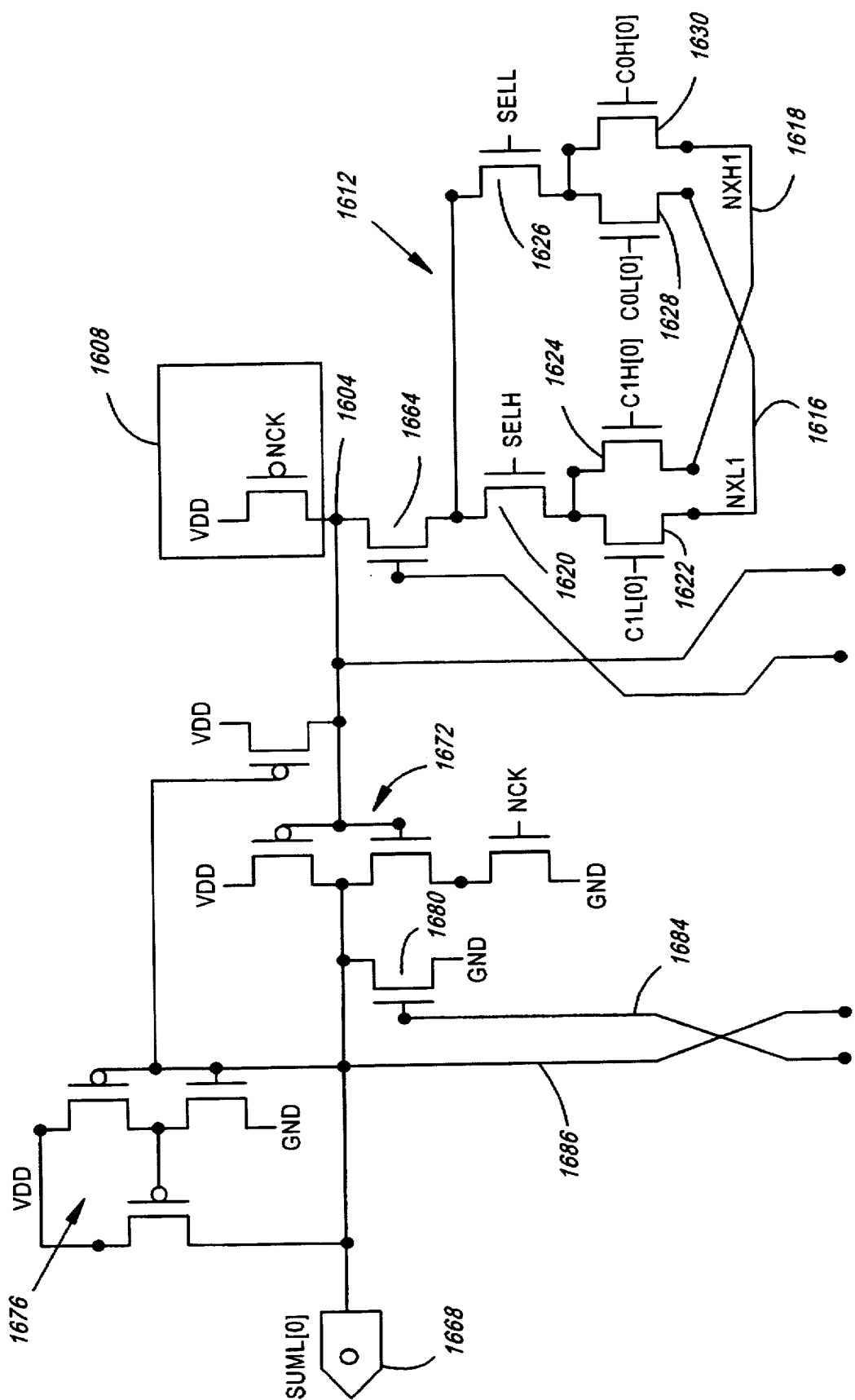
FIG. 16A is a schematic illustrating the low rail component of the FIG. 16 sum circuit.
Figure 16B:
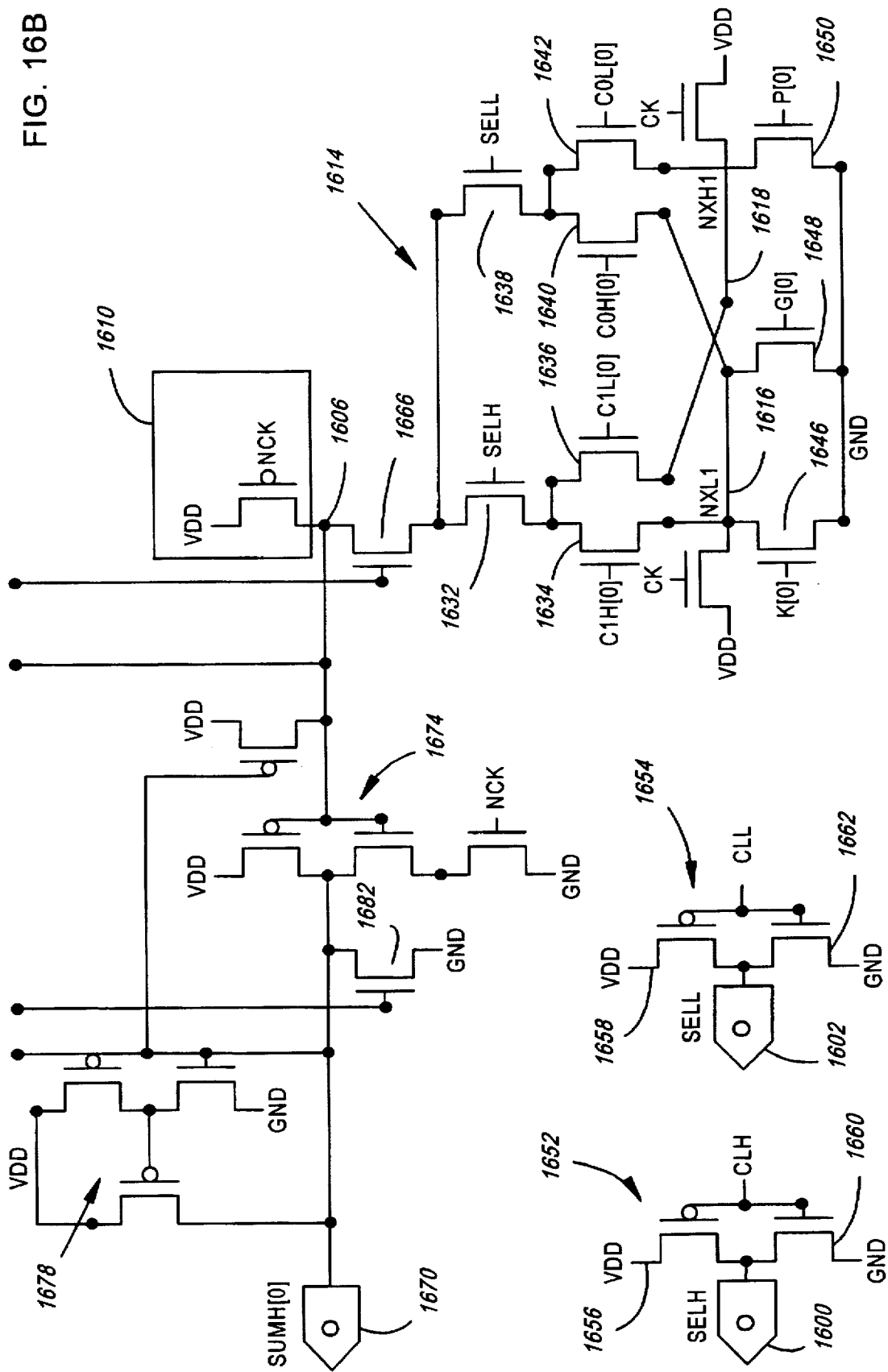
FIG. 16B is a schematic illustrating the high rail component of the FIG. 16 sum circuit.

Note that nodes NXL1 1616 and NXH1 1618 are common nodes in FIGS. 16A and 16B.

But for signals SELH 1600 and SELL 1602, the signals driving the transistors 1620–1650 of the dependent logic blocks 1612, 1614 have already been defined. SELH 1600 and SELL 1602 are the inverses of CLH and CLL (i.e., CL16H and CL16L, etc.). Rather than using CLH and CLL to drive pfets in the dependent logic blocks (i.e., 32 pfets in a 16 bit adder quadrant 206), CLH and CLL are inverted 1652, 1654 on a quadrant-wide basis (note that they are quadrant-wide variables derived from either 1) the long carry out of a lower quadrant 202–206 of the adder 200, or 2) the carry into the least significant quadrant 202 of the adder 200) and then used to drive multiple nfets 1620/1632, 1626/1638 in the dependent logic blocks 1612, 1614 (i.e., two pfets 1656, 1658 and sixty-six nfets 1620, 1626, 1632, 16381, 1660, 1662 in a 16 bit adder quadrant 206). This technique greatly reduces the size and power consumption of the adder 200, and increases its speed of operation.

The first 1612 and second 1614 dependent logic blocks are respectively connected to the first 1604 and second 1606 internal circuit nodes via a "logic disabling" fet 1664, 1666. The logic disabling fet 1664 connecting the first internal circuit node 1604 and logic block 1612 is driven by the second internal circuit node 1606, and vice versa. In this manner, the internal circuit node 1604, 1606 which is first to be driven to a logic low will be the only internal circuit node 1604, 1606 to be driven to a logic low. This 1) ensures a valid output 1668, 1670, and 2) guards against decaying nodes and the like. Each of the internal circuit nodes 1604, 1606 is buffered through an inverting buffer mechanism 1672, 1674 before being output as a component 1668, 1670 of the resultant sum bit. Each output 1668, 1670 is preferably latched. An exemplary latch arrangement 1676, 1678 is shown in FIGS. 16A and 16B. (NOTE: Various latching arrangements may be used. The illustrated latch 1676, 1678 arrangement is essentially derived from the teachings of Yetter found in U.S. Pat. No. 5,392,423 which is entitled "Universal Pipeline Latch for Mousetrap Logic Circuits". This patent is hereby incorporated by reference for all that it discloses.) Additionally, the outputs 1668, 1670 may be cross-coupled 1684, 1686 with "output disabling" fets 1680, 1682. In this manner, the circuit 1600 provides further assurance of a valid output 1668, 1670.

One can appreciate that the above described techniques, method and apparatus may be used to build a 64 bit high speed adder 200 capable of producing a sum 306 in four gate delays. Local Ling pseudo-carries and propagate terms are generated 102 (FIG. 1) in a single gate delay. Dual carries are produced 108 within each quadrant 202–208 of the adder 200 in four very fast gate delays. In parallel with the dual carry propagation 108, and in a single gate delay, local Ling pseudo-carries and local propagate terms are merged 104 to produce quadrant propagate terms and Ling pseudo-carries out of quadrants. After generation 104 of quadrant-wide carry and propagate terms, but also in parallel with the dual carry propagation 108, long carries which may be used in sum selection are generated 106. Long carry generation also occurs in one gate delay. Finally, and during a fourth and final gate delay, dual sums are generated 110, and an appropriate sum bits are selected quadrant by quadrant using the long carries (or in the least significant quadrant 202, where a long carry from a less significant quadrant does not exist, the carry into the adder 200).

A single rail version of the above adder 200 has also been contemplated. Its components would be substantially similar to those described above. However, static inverters would be required at the outputs of the adder 200 due to the inherent inversion of the exclusive OR function required to produce a sum. Construction of a single rail adder 200 using the above teachings is believed to be within the scope of one skilled in the art.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Apparatus for adding a quadrant of adjacent bits of operands A and B, the apparatus comprising:
   a) a plurality of dynamic CMOS logic circuits for generating local Ling pseudo-carries for adjacent groups of N corresponding input bits;
   b) a plurality of dynamic CMOS logic circuits for generating group of M local propagate terms for adjacent groups of M corresponding input bits, wherein M=N, but each of said groups of M input bits is of one bit less significance than a corresponding group of N input bits; and
   c) a plurality of dynamic CMOS logic circuits, coupled with the pluralities of dynamic CMOS logic circuits for generating local Ling pseudo-carries and local propagate terms, for generating a sum of the quadrant of adjacent bits of operands A and B;
   wherein each circuit in the plurality of dynamic CMOS logic circuits for generating local Ling pseudo-carries also generates a group of N−1 generate term corresponding to the less significant N−1 bits of a group of N input bits.

2. Apparatus as in claim 1, further comprising:
   a) a plurality of dynamic CMOS logic circuits for propagating real carries, C[I], into the most significant bits of groups of N input bits, each of the real carries being derived from a corresponding,
      i) group of N−1 generate term, and
      ii) group of M local propagate term;
   b) a plurality of dynamic CMOS logic circuits for propagating real carries, C[I], into the less significant N−1 bits of each group of N input bits, each of the real carries being derived from, a real carry propagated into the most significant bit of an immediate less significant group of N input bits; and wherein
   c) each dynamic CMOS logic circuit for generating the sum calculates SUM[I]=A[I]⊕B[I]⊕C[I], where SUM[I] is the Ith bit of the sum.

3. Apparatus as in claim 2, wherein each of the pluralities of dynamic CMOS logic circuits comprises a number of similar circuit modules.

4. Apparatus as in claim 2, wherein the inputs to the adder quadrant are dual rail inputs having high and low level logic components, and each of the dynamic CMOS logic circuits comprises dual circuits corresponding to the high and low level logic components of the adder quadrant's inputs.

5. Apparatus as in claim 2, further comprising:
   a circuit for generating a Ling pseudo-carry out of the quadrant, the Ling pseudo-carry out of the quadrant being derived from,
      a) the local Ling pseudo-carries, and
      b) the group of M local propagate terms.

6. Apparatus as in claim 5, further comprising:
   a) a dynamic CMOS logic circuit for generating a quadrant propagate term, the quadrant propagate term being the logical AND of the group of M local propagate terms; and
   b) a dynamic CMOS logic circuit for generating a long carry out of the quadrant, the long carry being derived from,
      i) the Ling pseudo-carry out of the quadrant;
      ii) the quadrant propagate term of the quadrant;
      iii) Ling pseudo-carries out of less significant quadrants of the adder; and
      iv) quadrant propagate terms corresponding to less significant quadrants of the adder.

7. Apparatus as in claim 5, wherein the circuit for generating a Ling pseudo-carry out of the quadrant is a Manchester carry chain.

8. Apparatus as in claim 1, wherein the bits of each group of N are numbered from least significant to most significant as bits 0 through N−1, and each circuit in the plurality of dynamic CMOS logic circuits for generating local Ling pseudo-carries and group of N−1 generate terms comprises:
   a) first and second arming mechanisms, respectively coupled with first and second circuit nodes;
   b) a first dynamic CMOS logic block coupled with the first circuit node, the first logic block implementing the function $G[N-2]+G[N-3] \cdot P[N-2]+ \ldots +G[0] \cdot P[N-2] \ldots P[1]$, where $P[I]=A[I] \oplus B[I]$, and $G[I]=A[I] \cdot B[I]$;
   c) a second dynamic CMOS logic block coupled with the second circuit node, the second logic block implementing the function $G[N-1]$;
   d) first, second and third inverting buffer mechanisms, the first and second inverting buffer mechanisms being coupled with the first circuit node, and the third inverting buffer mechanism being coupled with the second circuit node, wherein an output of the second inverting buffer mechanism is an N−1 bit generate term; and
   e) means for ORing outputs of the first and third inverting buffer mechanisms to produce a local Ling pseudo-carry.

9. A circuit as in claim 8, wherein the means for ORing outputs of the first and third inverting buffer mechanisms is a wired connection between the first and third inverting buffer mechanism outputs.

10. A circuit as in claim 8, wherein:
    a) each of the inverting buffer mechanisms comprises a pullup leg and a pulldown leg;
    b) the pulldown legs of the first and second inverting buffer mechanisms comprise a shared transistor; and
    c) the pulldown legs of the first and third inverting buffer mechanisms are connected in series.

11. Apparatus as in claim 8, wherein each first logic block comprises:
    a) multiple pulldown legs connected to the first circuit node, the multiple pulldown legs comprising transistors driven by the less significant N−1 bits of a group of N input bits; and the second logic block comprises:
    b) a single pulldown leg connected to the second circuit node, the single pulldown leg comprising transistors driven by the most significant bits of a group of N input bits.

12. Apparatus as in claim 8, wherein the bits of each group of M are numbered from least significant to most significant as bits 0 through M−1, and each circuit in the plurality of dynamic CMOS logic circuits for generating group of M local propagate terms comprises:

a) additional arming mechanisms;

b) additional circuit nodes to which the additional arming mechanisms are respectively connected;

c) additional dynamic CMOS logic coupled with the additional circuit nodes, the additional logic implementing the function P[M−1]·P[M−2] ... P[0]; and d) an additional inverting buffer mechanism connected to the additional circuit nodes, the output of the additional inverting buffer mechanism being a group of M propagate term corresponding to a particular group of M bits.

13. Apparatus as in claim 1, wherein M=N=4.

14. Apparatus as in claim 1, wherein each of the pluralities of dynamic CMOS logic circuits comprises a number of similar circuit modules.

15. Apparatus for propagating carries in an adder quadrant comprising inputs for adjacent bits of operands A and B, the apparatus comprising:

a) a plurality of dynamic CMOS logic circuits for generating local Ling pseudo-carries for adjacent groups of N corresponding input bits, wherein if the bits of each group of N are presumed to be numbered from least significant to most significant as bits 0 through N−1, each circuit in the plurality of dynamic CMOS logic circuits for generating local Ling pseudo-carries comprises:

i) a first arming mechanism;

ii) a first circuit node to which the first arming mechanism is connected;

iii) a first dynamic CMOS logic block coupled with the first circuit node, the first logic block implementing the function G[N−2]+G[N−3]·P[N−2]+ ... +G[0]·P[N−2] ... P[1], where P[I]=A[I]⊕B[I], and G[I]=A[I]·B[I]; and iv) a first inverting buffer mechanism connected to the first circuit node, the output of the first inverting buffer mechanism being a local Ling pseudo-carry corresponding to a particular group of N bits;

b) a plurality of dynamic CMOS logic circuits for generating group of M local propagate terms for adjacent groups of M corresponding input bits, wherein M=N, but each of said groups of M input bits is of one bit less significance than a corresponding group of N input bits; and c) a dynamic CMOS logic circuit for generating a Ling pseudo-carry out of quadrant, the Ling pseudo-carry out of the quadrant being derived from, i) the local Ling pseudo-carries, and ii) the group of M local propagate terms.

16. Apparatus as in claim 15, wherein M=N=4.

17. Apparatus as in claim 15, wherein the inputs to the adder quadrant are dual rail inputs having high and low level logic components, and each of the dynamic CMOS logic circuits comprises dual circuits corresponding to the high and low level logic components of the adder quadrant's inputs.

18. Apparatus as in claim 15, wherein the circuit for generating a Ling pseudo-carry out of the quadrant is a Manchester carry chain.

19. Apparatus for propagating carries in an adder quadrant comprising inputs for adjacent bits of operands A and B, the apparatus comprising:

a) a plurality of dynamic CMOS logic circuits for generating local Ling pseudo-carries for adjacent groups of N corresponding input bits;

b) a plurality of dynamic CMOS logic circuits for generating group of M local propagate terms for adjacent groups of M corresponding input bits, wherein M=N, but each of said groups of M input bits is of one bit less significance than a corresponding group of N input bits, and wherein if the bits of each group of M are presumed to be numbered from least significant to most significant as bits 0 through M−1, each circuit in the plurality of dynamic CMOS logic circuits for generating group of M local propagate terms comprises:

i) a second arming mechanism;

ii) a second circuit node to which the second arming mechanism is connected;

iii) a second dynamic CMOS logic block coupled with the second circuit node, the second logic block implementing the function P[M−1]·P[M−2] ... P[0]; and iv) a second inverting buffer mechanism connected to the second circuit node, the output of the second inverting buffer mechanism being a group of M propagate term corresponding to a particular group of M bits; and c) a dynamic CMOS logic circuit for generating a Ling pseudo-carry out of the quadrant, the Ling pseudo-carry out of the quadrant being derived from, i) the local Ling pseudo-carries, and ii) the group of M local propagate terms.

20. Apparatus as in claim 19, further comprising:

a) dynamic CMOS logic circuit for generating a quadrant propagate term, the quadrant propagate term being the logical AND of the group of M local propagate terms; and b) a dynamic CMOS logic circuit for generating a long carry out of the quadrant, the long carry being derived from, i) the Ling pseudo-carry out of the quadrant;

ii) the quadrant propagate term;

iii) Ling pseudo-carries out of less significant quadrants of the adder; and iv) quadrant propagate terms corresponding to less significant quadrants of the adder.

21. A method of producing carries in a dynamic CMOS adder quadrant implementing Ling's equations, the method comprising the steps of:

a) dynamically generating Ling pseudo-carries corresponding to adjacent groups of N corresponding input bits;

b) dynamically generating group of N−1 generate terms corresponding to the less significant N−1 bits of each group of N input bits;

c) dynamically generating group propagate terms corresponding to adjacent groups of M corresponding input bits, where M=N, but each of said groups of M input bits is of one bit less significance than a corresponding group of N input bits; and d) dynamically producing carries within the quadrant, the carries being derived from the Ling pseudo-carries, the group of N−1 generate terms, and the group propagate terms.

22. A method as in claim 21, wherein the step of producing carries within the quadrant comprises the steps of:

a) beginning with a predetermined group of N input bits, dynamically producing a carry into the group's most significant bit position by,
  i) logically ORing a single bit generate term of immediate less significance than the predetermined group of N with a carry into a less significant group of N's most significant bit,
  ii) logically ANDing the above with the predetermined group's corresponding multiple bit propagate term, and
  iii) logically ORing the above with the predetermined group's N−1 bit generate term;

b) sequentially repeating step a) for groups of N which are more significant than the predetermined group; and c) using the carry into a group of N's most significant bit, deriving carries into a more significant group of N's less significant N−1 bits.

23. A method as in claim 21, wherein the steps of generating Ling pseudo-carries and generating group propagate terms are performed substantially simultaneously.

* * * * *

UNITED STATES PATENT AND TRADEMARK OFFICE
CERTIFICATE OF CORRECTION

PATENT NO. : 5,719,803
DATED : February 17, 1998
INVENTOR(S) : Samuel D. Naffziger It is certified that error appears in the above-identified patent and that said Letters Patent is hereby corrected as shown below:

Column 2, Line 24: "c[4]" should be --C[4]-- (USPTO's error)

In the Claims:

Column 20, Line 55: Delete "inseries" and insert therefor --in series-- (USPTO's error)

Column 21, Line 51: After "of" insert --the-- (USPTO's error)

Column 22, Line 34: After "a)" insert --a-- (USPTO's error)

Signed and Sealed this

Fifteenth Day of May, 2001

Attest:

NICHOLAS P. GODICI

Attesting Officer    Acting Director of the United States Patent and Trademark Office